United States Patent
Zuercher et al.

(10) Patent No.: US 12,460,049 B2
(45) Date of Patent: Nov. 4, 2025

(54) AZIDE-FUNCTIONALIZED COPOLYMERS

(71) Applicant: SUSOS AG, Duebendorf (CH)

(72) Inventors: Stefan Zuercher, Zurich (CH); Tobias Komsthoeft, Zurich (CH); Samuele Tosatti, Duebendorf (CH); Lucca Trachsel, Oberrieden (CH)

(73) Assignee: SUSOS AG, Duebendorf (CH)

( * ) Notice: Subject to any disclaimer, the term of this patent is extended or adjusted under 35 U.S.C. 154(b) by 0 days.

(21) Appl. No.: 18/832,730

(22) PCT Filed: Jan. 25, 2023

(86) PCT No.: PCT/EP2023/051836
§ 371 (c)(1),
(2) Date: Jul. 24, 2024

(87) PCT Pub. No.: WO2023/144228
PCT Pub. Date: Aug. 3, 2023

(65) Prior Publication Data
US 2025/0101177 A1      Mar. 27, 2025

(30) Foreign Application Priority Data
Jan. 25, 2022  (EP) ..................... 22153331

(51) Int. Cl.
| | |
|---|---|
| C07D 263/00 | (2006.01) |
| A61K 47/59 | (2017.01) |
| C07D 265/00 | (2006.01) |
| C08G 69/08 | (2006.01) |
| C08G 69/42 | (2006.01) |
| C08G 73/02 | (2006.01) |
| C08G 77/452 | (2006.01) |
| C09D 177/02 | (2006.01) |

(52) U.S. Cl.
CPC ............ *C08G 69/42* (2013.01); *A61K 47/595* (2017.08); *C08G 69/08* (2013.01); *C09D 177/02* (2013.01)

(58) Field of Classification Search
None
See application file for complete search history.

(56) References Cited

U.S. PATENT DOCUMENTS

2014/0161845 A1    6/2014  Demuth et al.
2017/0369655 A1*  12/2017  Hunziker ............. A61K 47/551

FOREIGN PATENT DOCUMENTS

| WO | 2013/103297 A1 | 7/2013 |
| WO | 2016/037630 A1 | 3/2016 |
| WO | 2016/102663 A1 | 6/2016 |

OTHER PUBLICATIONS

Le Fer et al., Langmuir, 2017, vol. 33, pp. 2849-2860. (Year: 2017).*
Mar. 30, 2023 International Search Report issued in International Patent Application No. PCT/EP2023/051836.
Mar. 30, 2023 Written Opinion issued in International Patent Application No. PCT/EP2023/051836.
Chun-Hua Yang et al; "CuBr2-promoted intramolecular bromocyclization of N-allylamides and aryl allyl ketone oximes;" TETRAHEDRON; vol. 73; No. 48; pp. 6747-6753; Oct. 12, 2017.
Richard Hoogenboom et al; "Thermoresponsive poly(2-oxazoline)s, polypeptoids, and polypeptides;" Polymer Chemistry; vol. 8; No. 24; pp. 24-40; 2017.
Richard Hoogenboom; Editorial "50 years of poly(2-oxazoline)s;" European Polymer Journal; vol. 88; pp. 448-450; 2017.
Christian Petri; "Synthesis and Characterization of Novel Photoscrosslinkable Poly(2-Oxazoline)-Based Hydrogel Systems for the Application as Biosensor Matrix;" Chapter 4.3; pp. 1-239; 2018.

* cited by examiner

Primary Examiner — Brian Gulledge
(74) Attorney, Agent, or Firm — MH2 Technology Law Group, LLP

(57) ABSTRACT

The present invention relates to a copolymer having several azide functionalities that can be prepared by cationic ring opening polymerisation. The copolymer comprises a first monomer unit and a second monomer unit which are different from each other.

20 Claims, 4 Drawing Sheets

AZIDE-FUNCTIONALIZED COPOLYMERS

The present invention relates to azide-functionalized copolymers.

Polyethylene glycol (PEG) is the standard polymer for a number of biochemical applications. One major drawback of materials comprising polyethylene glycol (PEG) polymers is their short shelf-life and storage instability due to peroxide formation. Furthermore, functionalization is only possible at the two ends of the polymer chain. This limits the possible surface-azide density and therefore the reactivity of the sensor surface towards target molecules which have typically low concentration.

Finally, another emerging problem of PEG is that a part of the human population starts to generate allergies against PEG. This might become even more problematic as PEG-lipids are used for commercially available mRNA covid-19 vaccines and a high number of people got vaccinated with the new mRNA covid vaccines.

WO2016102663A1 discloses the preparation of poly-2-oxazoline amphiphilic polymers and copolymers thereof. Self-assembled particles comprising these amphiphilic polymers can be used for targeted delivery of therapeutic and diagnostic agents. Said polymers have the drawback that they have long hydrophobic linker side chains which negatively interact with body fluids.

WO2013103297A1 discloses functionalized poly(2-oxazoline) polymers as a carrier and/or delivery vehicle (conjugate) of drugs, such as small therapeutic molecules and bio-pharmaceuticals. Said functionalized poly(2-oxazoline) polymers may carry an azide functionality, but said functionality has to be induced post polymerization, i.e. by introducing the azide groups after carrying out the polymerisation. This results in additional synthetic steps which is of course expensive. Furthermore, complete conversion is not guaranteed leading to quality problems which is, particular in medical applications, not acceptable.

The object of the present invention was to provide functionalized biocompatible polymers that can be used in a variety of applications and that are easily accessible.

The problem is solved by the copolymers according to claim 1. Preferred embodiments are subject of the dependent claims.

The copolymer according to the present invention comprises at least a first and a second monomer unit, wherein said first and said second monomer unit are different from each other, wherein the first monomer unit is selected from the group consisting of compounds 202, 203, 204, 205, 206, 207, 302, 303, 304, 305, 306, and 307

| No. | Monomer unit | No. | Monomer unit |
|---|---|---|---|
| 202 | | 302 | |
| 203 | | 303 | |
| 204 | | 304 | |
| 205 | | 305 | |
| 206 | | 306 | |
| 207 | | 307 | | wherein x is 1 to 5, preferably 1 to 3, and the second monomer unit is selected from the group consisting of 2-methyl-4,5-dihydro-1,3-oxazole, 2-ethyl-4,5-dihydro-1,3-oxazole, 2-methyl-5,6-dihydro-4H-1,3-oxazine and 2-ethyl-5,6-dihydro-4H-1,3-oxazine with the proviso that if the second monomer unit is 2-ethyl-4,5-dihydro-1,3-oxazole, the first monomer unit is selected from the group consisting of compounds 202, 204 and 205, and if the second monomer unit is 2-ethyl-5-6-dihydro-4H-1,3-oxazine, the first monomer unit is selected from the group consisting of compound 302, 304 and 305.

The copolymers comprising several azide functionalities can be prepared by cationic ring opening polymerisation. Due to their water solubility, such copolymers can replace PEG in many biochemical applications such as protein functionalization for improved stability in blood, surface modification to reduce fouling and non-specific adsorption of proteins and other biofoulants and in vaccines, for example to replace the PEG-lipids which are currently used for commercially available mRNA covid-19 vaccines.

The selection of the first monomer unit and the second monomer unit results in a copolymer having a high hydrophilicity, and therefore, with an excellent protein resistance. Due to their hydrophilicity the copolymers according to the present invention have a lower critical solution temperature (LCST) in water above 90° C. resulting in an exceptional water solubility. The LCST is the critical temperature below which the components of a mixture are miscible in all proportions. A high hydrophilicity is important to obtain low fouling coatings while keeping the possibility for selective functionalization via azide-alkyne click chemistry. It could be shown that this effect can be obtained by reducing the amounts of hydrophobic groups in the copolymer chain as low as possible. For example, polyethyloxazoline has a LCST of 75° C. in water while polymethyloxazoline does not show LCST in water. Increasing the side chain length to butyl as in poly(2-butyl-2-oxazoline) the copolymer becomes completely insoluble in water (Hoogenboom, R.; Schlaad, H. Thermoresponsive Poly(2-Oxazoline)s, Polypeptoids, and Polypeptides. Polym. Chem. 2017, 8, 24-40. [http://doi.org/10.1039/C6PY01320A]). This is a significant advantage when compared to polymers or copolymers with a low LCST which are known to interact with biomolecules by hydrophobic interactions and thus leading to fouling. The copolymers according to the present invention do not have to be post-modified to increase their hydrophilicity which would unnecessarily consume at least part of the azide groups available for further modification.

This can be easily achieved by copolymerization. The first monomer unit is selected from the group consisting of compounds 202, 203, 204, 205, 206, 207, 302, 303, 304, 305, 306, and 307 and the second monomer is selected from the group consisting of 2-methyl-4,5-dihydro-1,3-oxazole, 2-ethyl-4,5-dihydro-1,3-oxazole, 2-methyl-5,6-dihydro-4H-1,3-oxazine and 2-ethyl-5-6-dihydro-4H-1,3-oxazine, if the second monomer unit is 2-ethyl-4,5-dihydro-1,3-oxazole, the first monomer unit is selected from the group consisting of compounds 202, 204, 205, and if the second monomer unit is 2-ethyl-5-6-dihydro-4H-1,3-oxazine, the first monomer unit is selected from the group consisting of compound 302, 304 and 305. By keeping the chain very short or hydrophilic, it's possible to keep LCST>90° C. at high azide monomer concentration. A copolymer of 2-ethyl-4,5-dihydro-1,3-oxazole and compound 203 for example results in a copolymer that is too hydrophobic with a LCST of even lower than the one of polyethyloxazoline, whereas a copolymer comprising 2-methyl-4,5-dihydro-1,3-oxazole and compound 203 provides still an excellent protein resistance. In addition, the copolymer according to the present invention can be obtained by open ring polymerisation without destroying the azide group, since the first monomer units are stable enough under typical reaction conditions.

The term protein-resistance is expressed in % as reduction of protein uptake on a sample coated with the copolymer according to the present invention compared to uncoated reference sample and is higher than 90%. Such a high protein-resistance is a prerequisite for many medical and bio-medical applications. Within the context of the present invention the term "non-fouling" refers to a quality of preventing or minimizing fouling. Thus, a non-fouling interfacial biomaterial can be used to reduce attachment of biomaterials to a surface, and to reduce aesthetic and operational consequences of fouling. The term protein-resistance and non-fouling characteristics can be used as synonyms.

In one embodiment of the present invention the first polymer unit is selected in that the first monomer unit is selected from the group 202, 203, 204, 205, 302, 303, 304, and 305 since they are less bulky and have therefore a tendency to form better coatings.

The first monomer units can be obtained by converting compounds of formula (IV) into compounds of formula (I).

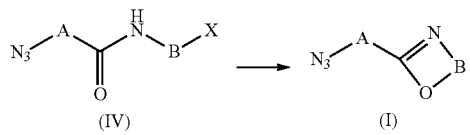

wherein A is selected from the group consisting of —(CH$_2$)$_n$—, —CHF—, —CF$_2$—, 2,3,5,6-tetrafluoro-1,4-phenylene and —(CH$_2$CH$_2$O)$_m$—, and n is 2 or 3 and m is 1 to 5, preferably 2 or 3.

Compounds 202, 203, 204, 205, 206, 207 correspond to compounds of formula (I), wherein B is an ethan-1,3-diyl group, and X is Cl or Br.

Compounds of formula 302, 303, 304, 305, 306, and 307 correspond to compounds of formula (I), wherein B is a propane-1,3-diyl group, and X is Cl or Br.

Preferably, the ring closure reaction takes place under basic conditions.

The following intermediates having the general formula (IV)

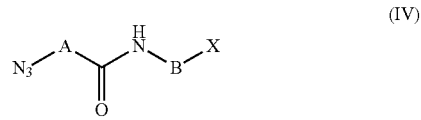

wherein A and B are defined as above, and X is Cl or Br are formed.

Due to their high reactivity, the synthesis of the intermediates is challenging. Mild and controlled conditions have to be applied in order to avoid side products. Especially good results could be obtained if X is Br as this allows a better control of the synthesis thanks to lower reaction temperature, and thus higher yields. Furthermore, side products can be avoided by converting the acid in the corresponding ester derivative before synthesizing the azide, Br-A-COOH→Br-A-COOCH$_3$→N$_3$-A-COOCH$_3$ which is particularly important if A is propan-1,3-diyl.

Preferably, the intermediates of formula (IV) are selected from the group consisting of intermediate 402, 403, 404, 405, 406, 407, 408, 409, 410, 411, 412, 413, 414, 415, 416, 417, 418, 419, 420, 421, 423, 424, 425, 426, 427 and 428

| No. | Intermediate |
|---|---|
| 402 | |
| 403 | |
| 404 | |
| 405 | |
| 406 | |
| 407 | |

| No. | Intermediate |
|---|---|
| 409 | N₃–CH₂CH₂–C(=O)–NH–CH₂CH₂CH₂–Cl |
| 410 | N₃–(CH₂)₃–C(=O)–NH–CH₂CH₂CH₂–Cl |
| 411 | N₃–CHF–C(=O)–NH–CH₂CH₂CH₂–Cl |
| 412 | N₃–CF₂–C(=O)–NH–CH₂CH₂CH₂–Cl |
| 413 | N₃–C₆F₄–C(=O)–NH–CH₂CH₂CH₂–Cl |
| 414 | N₃–(CH₂CH₂O)ₓ–C(=O)–NH–CH₂CH₂CH₂–Cl |
| 416 | N₃–CH₂CH₂–C(=O)–NH–CH₂CH₂–Br |
| 417 | N₃–(CH₂)₃–C(=O)–NH–CH₂CH₂–Br |
| 418 | N₃–CHF–C(=O)–NH–CH₂CH₂–Br |
| 419 | N₃–CF₂–C(=O)–NH–CH₂CH₂–Br |
| 420 | N₃–C₆F₄–C(=O)–NH–CH₂CH₂–Br |
| 421 | N₃–(CH₂CH₂O)ₓ–C(=O)–NH–CH₂CH₂–Br |
| 423 | N₃–CH₂CH₂–C(=O)–NH–CH₂CH₂CH₂–Br |
| 424 | N₃–(CH₂)₃–C(=O)–NH–CH₂CH₂CH₂–Br |
| 425 | N₃–CHF–C(=O)–NH–CH₂CH₂CH₂–Br |
| 426 | N₃–CF₂–C(=O)–NH–CH₂CH₂CH₂–Br |
| 427 | N₃–C₆F₄–C(=O)–NH–CH₂CH₂CH₂–Br |
| 428 | N₃–(CH₂CH₂O)ₓ–C(=O)–NH–CH₂CH₂CH₂–Br | wherein x is 1 to 5, preferably 1 to 3.

The copolymer according to the present invention can be used as starting material for an azide-functionalized polymer Z having the formula (V), and in particular azide-functionalized copolymers Z of the formulae (VI) and (VII).

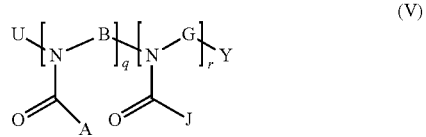

(V)

wherein
A is selected from the group consisting of —(CH$_2$)$_n$—, —CHF—, —CF$_2$—, 2,3,5,6-tetrafluoro-1,4-phenylene and —(CH$_2$CH$_2$O)$_m$—, wherein
n is 2 or 3,
m is 1 to 5, preferably 1, 2 or 3,
J is selected from the group consisting of CH$_3$ and CH$_2$CH$_3$,
B and G are independent from each other selected from the group consisting of ethylene group and propane-1,3-diyl, U is the residue of the initiator of the cationic ring opening polymerisation (CROP), and is preferably selected from the group consisting of hydrogen, hydroxy, $C_1$ to $C_{18}$ alkyl, aryl, $C_1$ to $C_{18}$ alkylamine and $C_1$ to $C_{18}$ alkoxy, $C_1$ to $C_{18}$ ester, $C_1$ to $C_{18}$ carboxy, alkyl silyl, $C_1$ to $C_{18}$ formates, allyl, vinyl, styrenyl, anthracenyl, cholesteryl, $C_1$ to $C_{18}$ alkenyl, $C_1$ to $C_{18}$ alkynyl, amines, thioles, thioesters, thioether and silylethers, and most preferably selected from the group consisting of methyl (which is easy to handle and does not decrease the hydrophilicity of the polymer); $C_1$ to $C_{18}$ ester (which can be easily converted into an acid or an amide); acrylate, vinyl and styrenyl (which can be used for a potential polymerisation);

Y is a nucleophilic group that terminates the polymerisation reaction, preferably selected from the group consisting of hydroxy, amino, azides and thioles, q and r are independent from each other 5 to 1000, preferably 40 to 1000, and in particular in azide-functionalized co-polymers Z of the formulae (VI) and (VII)

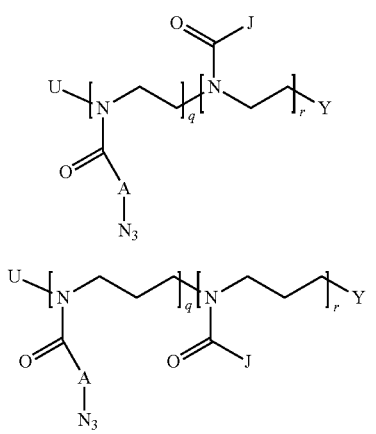

wherein

A is selected from the group consisting of —(CH$_2$)$_n$—, —CHF—, —CF$_2$—, 2,3,5,6-tetrafluoro-1,4-phenylene and —(CH$_2$CH$_2$O)$_m$—, wherein n is 2 or 3, m is 1 to 5, preferably 1, 2 or 3, J is selected from the group consisting of CH$_3$ and CH$_2$CH$_3$, U is the residue of the initiator of the cationic ring opening polymerisation (CROP), and is preferably selected from the group consisting of hydrogen, hydroxy, $C_1$ to $C_{18}$ alkyl, aryl, $C_1$ to $C_{18}$ alkylamine and $C_1$ to $C_{18}$ alkoxy, $C_1$ to $C_{18}$ ester, $C_1$ to $C_{18}$ carboxy, alkyl silyl, $C_1$ to $C_{18}$ formates, allyl, vinyl, styrenyl, anthracenyl, cholesteryl, $C_1$ to $C_{18}$ alkenyl, $C_1$ to $C_{18}$ alkynyl, amines, thioles, thioesters, thioether and silylethers, and most preferably selected from the group consisting of methyl (which is easy to handle and does not decrease the hydrophilicity of the polymer); $C_1$ to $C_{18}$ ester (which can be easily converted into an acid or an amide); acrylate, vinyl and styrenyl (which can be used for a potential polymerisation);

Y is a nucleophilic group that terminates the polymerisation reaction, preferably selected from the group consisting of hydroxy, amino, azides and thioles, and q and r are independent from each other 5 to 1000.

Cationic polymerization involves three phases: initiation, propagation and termination. The reaction begins with the generation of an electrophilic initiator. Typically, polymerization is initiated by an electrophilic initiator. Propagation follows next and involves the addition of monomeric species to a growing chain, which will bear a positive charged endgroup. Termination ends the propagation reaction and occurs when the growing chain recombines with any nucleophile. Electrophilic initiators that initiate the cationic polymerisation reaction are known to the skilled person.

Possible initiators of the cationic ring opening polymerisation are lewis acids, acid halides, silyl halides, chloroformates and various alkylating agents such as alkyl halides, alkyl tosylates and alkyltriflates. It is also possible to introduce a functional group that is incompatible with the CROP of the monomers according to the present invention, by making use of an appropriate protecting group. Examples for such protected functional initiators are tert-butyloxycarbonyl (Boc) protected amines, phthalimides, or quaternary ammonium salts, thio esters, carboxylic acids esters, acetals, cyclocarbonates and silyl ethers. Especially preferred the cationic polymerization initiator is selected from the group consisting of lewis acids, acid halides, silyl halides, chloroformates and various alkylating agents such as alkyl halides, alkyl tosylates, alkyltriflates, diphenyl iodonium hexafluorophosphate, tetramethylene sulfonium hexafluorarsenate, triphenylsulfonium fluoroborate, triphenylsulfonium chloride, diphenyliodonium fluoroborate, triphenylsulfonium hexafluoroarsenate, triphenylsulfonium, trifluoromethanesulfonate and hexafluoroantimonate.

Typical nucleophilic groups that terminate the polymerisation reaction are preferably selected from the group consisting of hydroxy, amino, azides and thioles. This may also include diamines and dioles which lead to a spacer having a nucleophilic terminal group, such shown for example in compounds of formula VIb, and VIIb.

Preferred embodiments of the functional polymers Z are selected from the group consisting of VIa

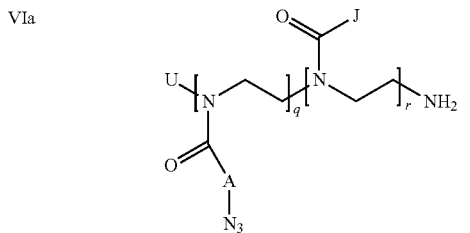

VIb

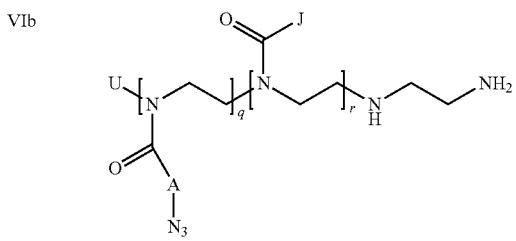

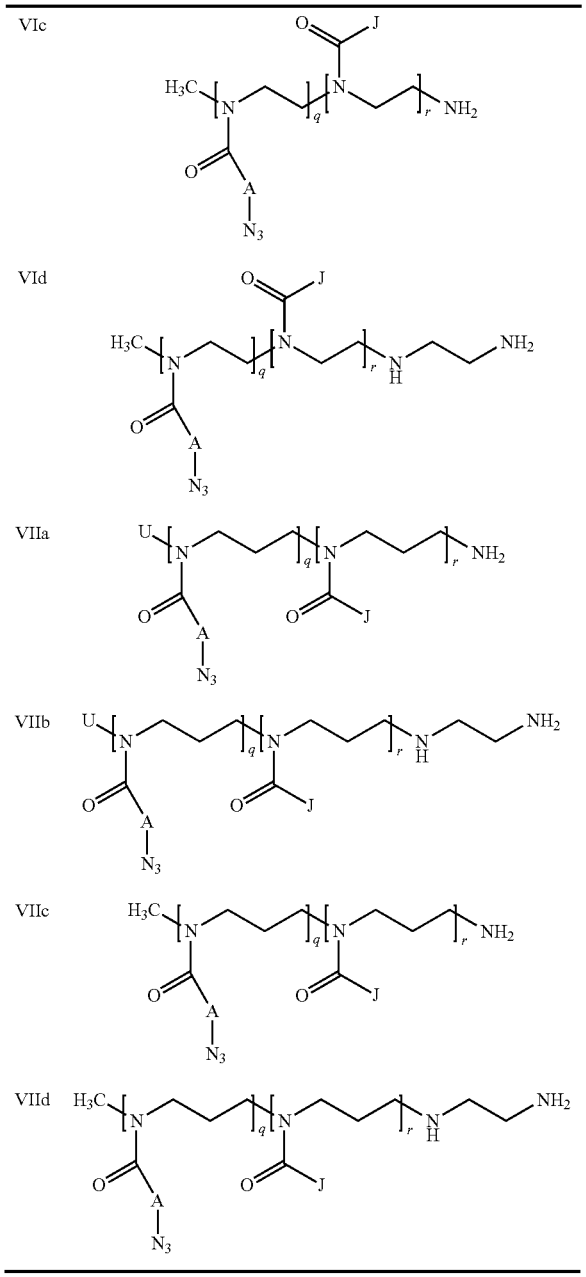

In one embodiment of the present invention the second monomer unit is 2-methyl-4,5-dihydro-1,3-oxazole. Preferably, the first monomer unit comprises a five-membered ring, thus is selected from compounds 202, 202, 203, 204, 205, 206 and 207 since they have similar polymerisation kinetics. Most preferably, the first monomer unit is selected from the group consisting of compounds 202 and 203, and ideally compound 3 resulting in a copolymer with excellent protein resistance. Preferably, such copolymers comprise 1 to 30% of the first monomer unit and 70 to 99% of the second monomer unit, preferably 5 to 15% of the first monomer unit and 85 to 95% of the second monomer unit resulting in a copolymer having a high hydrophilicity and enough azide groups for selective functionalization via azide-alkyne click chemistry.

In another embodiment of the present invention the second monomer unit is 2-methyl-5,6-dihydro-4H-1,3-oxazine. Preferably, the first monomer unit comprises a six-membered ring, thus is selected from compounds 302, 303, 304, 305, 306, and 307 they have similar polymerisation kinetics.

In a further embodiment of the present invention the copolymer comprises in addition to a first monomer unit A1 and a second monomer unit B1 an additional monomer unit, which is a further first monomer unit A2 or a further second monomer unit B2, whereby said further first monomer unit A2 is different from the first monomer unit A1 and the second monomer unit B2 is different from the second monomer unit B1. This allows to obtain a higher concentration of azides towards the end of the chain. Examples are copolymers comprising compound 203 as first monomer unit A1 and 2-methyl-4,5-dihydro-1,3-oxazole and 2-methyl-5,6-dihydro-4H-1,3-oxazine as second monomer units B1 and B2;

compound 204 as first monomer unit A1 and 2-methyl-4,5-dihydro-1,3-oxazole and 2-methyl-5,6-dihydro-4H-1,3-oxazine as second monomer units B1 and B2;

compound 205 as first monomer unit A1 and 2-methyl-4,5-dihydro-1,3-oxazole and 2-methyl-5,6-dihydro-4H-1,3-oxazine as second monomer units B1 and B2; and compound 203 as first monomer unit A1 and 2-ethyl-4,5-dihydro- and 2-ethyl-5-6-dihydro-4H-1,3-oxazine as second monomer units B1 and B2.

Preferably, the copolymers according to the present invention comprise 25 to 150 monomer units in total, preferably 50 to 100 monomer units. Such co-polymers are long enough to allow access to the azide functional groups, while at the same time are easy to handle.

Especially preferred are copolymers comprising 2-methyl-4,5-dihydro-1,3-oxazole and 2-(3-azidopropyl)-4,5-dihydro-1,3-oxazole as monomer units. Copolymers comprising 2-(3-azidomethyl)-4,5-dihydro-1,3-oxazole have excellent hydrophilicity and stealth properties. Copolymers comprising 2-(3-azidopropyl)-4,5-dihydro-1,3-oxazole allow a better accessibility of the azide for further reactivity. The azide functionalisation of the polymer can be controlled by the monomer ratio. Thus, depending on the requirements of a particular application, the numbers of azide groups and the position of said azide groups within the polymer can be adapted. A high azide density is especially preferred in biosensing applications where short reaction times are necessary and target molecule concentration is typically low. A maximum azide loading of the polymer while keeping its protein resistance (no nonspecific binding) is therefore key for such applications. For applications where reaction time is less critical, e.g. if the further functionalisation of the polymer is performed in solution, a lower azide content might be beneficial to control the degree of functionalisation by the degree of azide content of the polymer.

In the copolymers according to the present invention the first monomer units and the second monomer units can be randomly distributed, resulting in randomly distributed azides along the chain. Also block copolymers are possible due to the living nature of the cationic ring opening polymerisation method. This allows, for example, to locate the azide functionalization within the copolymer depending on its application. By combining oxazole and oxazine monomers, due to their different polymerisation kinetics such pseudo-block or gradient polymers can be formed. Both ends of the polymer chain can be further selectively functionalized with additional reactive functionalities by choosing a corresponding functionalized initiator and terminating reagent. Such functionalizations are known to the skilled person and are for example disclosed in Hoogenboom, R. 50 Years of poly(2-oxazoline) S. Eur. Polym. J. 2017, 88, 448-450.

Said azide groups of the copolymer can be easily modified, for example via click chemistry to form triazoles, reduced to amines, or by exposure to energy (temperature, light) they can release $N_2$ to form highly reactive nitrene intermediates that react nonspecific with neighbouring groups (for example insertion into C—H bonds).

In a further aspect of the present invention, the azide-functionalized copolymers according to the present invention comprise a terminal linker group, wherein said terminal linker group is preferably an amine group, and most preferably a primary amine group. Said primary amine group can for example react with a reactive group on a polymer backbone or a surface-active group as a post-modification.

A further aspect of the present invention relates to the use of a copolymer having a terminal linker group for coating a surface comprising a surface active headgroup, wherein said terminal head group is intended to irreversibly bind to a substrate, preferably a surface active headgroup having a linear or branched, substituted or unsubstituted $C_1$ to $C_{12}$ alkylene group which optionally comprises heteroatoms selected from the group consisting of oxygen and nitrogen, and which carries at least one functional end or side group K5 selected from the group of alkoxy silanes, chloro silanes, catechols, nitrocatechols, bromocatechols, chlorocatechols, phosphates, phosphonates, mimosine derivatives, anacheline, gallols, thiols, N-heterocyclic carbenes, perfluorophenyl azides, benzophenon, diaryldiazomethane, aryltrifluoromethyldiazomethane, and organoboron.

A further aspect of the present invention relates to a functional polymer comprising a polymer backbone and a plurality of side chains, wherein at least a part of said side chains are copolymers according to the present invention. For example, EP3191559A1 discloses functional polymers. The contents of EP3191559A1 are hereby incorporated by reference in its entirety. Until now it was not possible to synthesize such polymers with more than one azide group per side chain. Preferably, the polymer backbone is a polyacrylamide.

In one embodiment of the present invention a functional polymer is a polymer wherein all side chains are copolymers according to the present invention. Such functional polymers are highly desirable in biosensing applications since they allow for a high surface-azide density while keeping a high protein resistance.

In another embodiment of the present invention a functional polymer is a polymer that comprises at least two types of side chains, wherein at least one type of side chain is an azide-functionalized copolymer according to the present invention. Of course, each type of side chain comprises a plurality of identical side chains.

Azide-functionalized polymers comprising a terminal linker group can react with a reactive group on the polymer backbone, which is preferably selected from the group consisting of esters, activated esters, chloro, fluoro, acrylate, methacrylate, NHS esters, epoxides, anhydrides, azides, alkines, and acyltrifluoroborates. Thus, the azide-functionalized copolymer can be introduced into a functional polymer by post-modification of a polymer backbone carrying a reactive group. Preferably, the polymer backbone is a polyacrylamide, and polymer backbone and the side chains are linked by amide bonds.

Preferably, such a functional polymer

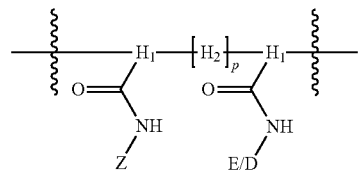

comprises an azide-functionalized copolymer Z as first type of side chain and at least one further type of side chain D, which is intended to reversibly bind to a substrate or has a coating function, and $H_1$ is an alkylene or arylene group and $[H_2]_p$ is an amide, an ester or an ether group and p is either 0 or 1, preferably 0.

D is selected from the group consisting of a short side chain D1 having a linear or branched, substituted or unsubstituted $C_1$ to $C_{12}$ alkylene group which optionally comprises heteroatoms selected from the group consisting of oxygen and nitrogen, and which carries at least one functional side or end group K1 selected from the group consisting of amines, carboxy, poly(propylene sulfide), and thio-ethers, whereby said functional group K1 is preferably an end group;

a long side chain D2 comprising more than 15 carbon or silicium atoms in the chain being selected from the group consisting of polydimethylsiloxane, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide), poly(2-hydroxyethyl methacrylate), poly(hydroxypropylmethacrylate), poly(methacryloyloxylethyl phosphorylcholine), poly(sulfobetaine methacrylate), polyalkylene residues having more than 20 carbon atoms, peptide chains, DNA fragments and poly(sulfobetaine acrylamide), whereby D2 has no further functional end group or side group;

a long side chain D3 selected from the group consisting of a polydimethylsiloxane, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacryl-amide), poly(N-hydroxyethylacrylamide), poly(2-hydroxyethyl methacrylate), poly-hydroxypropylmeth-acrylate), poly(methacryloyloxylethyl phosphoryl-choline), poly(sulfobetaine methacrylate), polyalkylene residues having more than 20 carbon atoms, peptide chains, DNA fragments and poly(sulfobetaine acrylamide), whereby D3 carries at least one functional end or side group K3 selected from the group consisting of amines, carboxy, nitrilotriacetic acid (NTA), biotin, azide, terminal alkene groups, terminal alkine groups, tetrazine whereby said functional group K3 is preferably an end group.

Preferably, the functional polymer, in addition or alternatively to at least one type of side chain D, may comprise a further type of side chain which is intended to irreversibly bind to a substrate, said side chain E having a linear or branched, substituted or unsubstituted $C_1$ to $C_{12}$ alkylene group which optionally comprises heteroatoms selected from the group consisting of oxygen and nitrogen, and which carries at least one functional side or end group K4 selected from the group of alkoxy silanes, chloro silanes, catechols, nitrocatechols, bromocatechols, chlorocatechols, phosphates, phosphonates, mimosine derivatives (including compounds having an N-(3-hydroxy-4-oxypyridyl residue), anacheline, gallols, thiols, N-heterocyclic carbenes, perfluorophenyl azides, benzophenon, diaryldiazomethane, aryltrifluoromethyldiazomethane, and organoboron, whereby said functional group K3 is preferably an end group. Interestingly, perfluorophenyl azides can be selectively activated by UV without inactivating the azide groups in the azide-functionalized polymer.

Within the context of the present invention the term side group means a group of atoms attached to a carbon atom within the side chain and an end group is a group at the end of the side chain, that is its terminal group.

In preferred embodiments of the present invention the functional polymer is selected from polymers comprising the following types of side chains
  azide-functionalized co-polymer Z
  azide-functionalized co-polymer Z and side chain D1
  azide-functionalized co-polymer Z and side chain D2
  azide-functionalized co-polymer Z and side chain D3
  azide-functionalized co-polymer Z and side chain E
  azide-functionalized co-polymer Z, side chain D1 and side chain D2
  azide-functionalized co-polymer Z, side chain D1 and side chain D3
  azide-functionalized co-polymer Z, side chain D3 and side chain D2
  azide-functionalized co-polymer Z, side chain D1 and side chain E
  azide-functionalized co-polymer Z, side chain E and side chain D2
  azide-functionalized co-polymer Z, side chain E and side chain D3
  azide-functionalized co-polymer Z, side chain D1, side chain D2 and side chain D3
  azide-functionalized co-polymer Z, side chain D1, side chain E and side chain D3
  azide-functionalized co-polymer Z, side chain D1, side chain D2 and side chain E
  azide-functionalized co-polymer Z, side chain D2, side chain E and side chain D3, and
  azide-functionalized co-polymer Z, side chain D1, side chain D2, side chain D3 and side chain E;
whereby, the order within the polymer chain is not defined by the order of the chains as listed above.

Preferably, the functional polymer according to the present invention comprises at least 1 to 200 identical side chains per type of side chain.

Especially preferred side chains D1 are selected from the group consisting of aminobutyl, aminopentyl and aminohexyl, preferably aminohexyl.

Especially preferred side chains D2 are selected from the group consisting of polyalkyloxazolines, polyalkyloxazines and polyethylene glycol;

Especially preferred side chains D3 are selected from the group consisting of biotin, NTA, a terminal alkene group and a terminal alkine group.

Especially preferred side chains E are selected from the group consisting of alkoxy silanes, chloro silanes, especially aminopropyldimehylethoxysilane, and catechols, especially nitrocatechol.

Preferably, all different types of side chains comprise a terminal linker group selected from the group consisting of hydroxy, amine and thiol, preferably amine, to link the side chain to the polymer backbone. Thus, for example for aminohexyl side chain N-Boc-1,6-hexanediamine can be used as starting compound, for the 4-(ethyl)-5-nitrobenzene-1,2-diol side chain nitrodopamine can be used as starting compound and for dimethylsiloxane side chain 3-[ethoxybis(methyl)silyl]propylamine can be used as starting compound.

In one aspect of the present invention, the azide-functionalized polymer is a copolymer comprising 2-methyl-4,5-dihydrooxazole and 2-(3-azidopropyl)-4,5-dihydro-1,3-oxazole as monomer units or a copolymer comprising 2-methyl-4,5-dihydrooxazine and 2-(3-azidomethyl)-4,5-dihydro-1,3-oxazine as monomer units. The azide functionalisation of the polymer can be controlled by the monomer ratio.

Preferred embodiments of the functional polymers are selected from the group consisting of

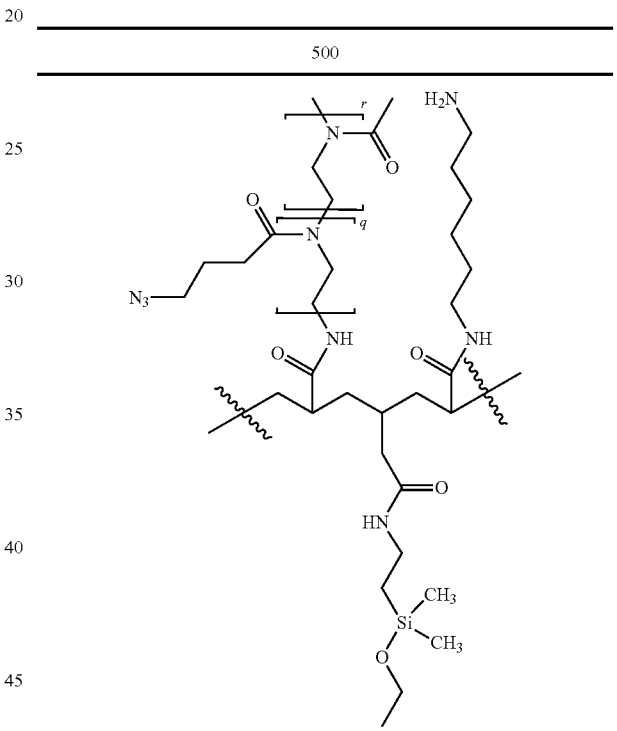

500

Preferred application:
Coating material for hydroxy functionalized substrates, especially SiO₂ functionalized substrates, silicate glasses and polymers to immobilize peptides, antibodies and fluorescent markers, via azide alkyne click chemistry in high concentration. This allows the buildup of extremely sensitive biosensor surfaces.
It's especially well-suited to coat microfluidic devices.
Another application can be implants to be coated with a dense layer of cell binding peptides such as RGD.
Geometrically diverse substrates can be coated by a fast and easy dip and rinse process.
Substrates can be large scale but also nano- and micro particles are possible substrates.
A high density of antimicrobials can be attached to produce antimicrobial surfaces or particles.
This polymer is especially well suited, if the binding positions along the polymer chain need to have a spacing to avoid interference between bound residues.

| 502 |
|---|
| 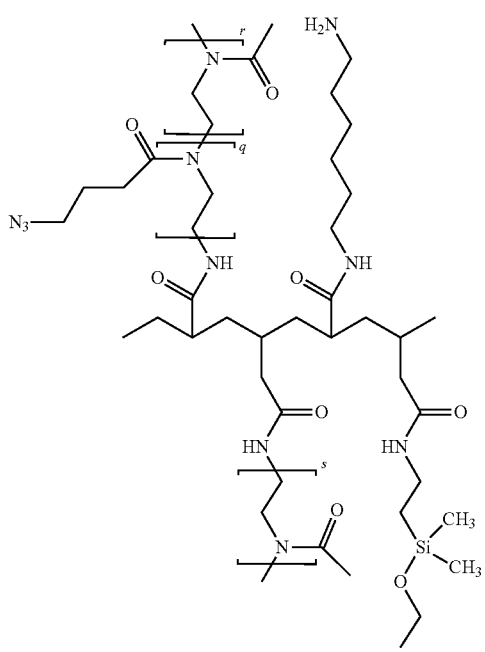 |
| Preferred application:<br>As for 500, but short non-functional PMOXA chains deliver a stealth surface while the long azide functional chains extend far into the liquid and increase accessibility for binding. |

| 504 |
|---|
| 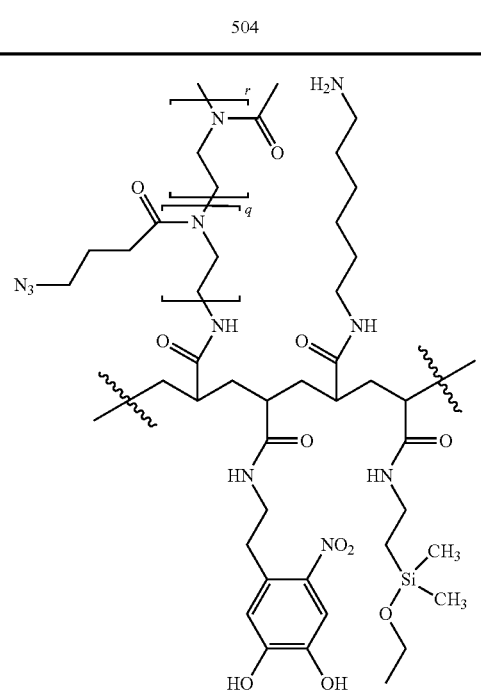 |
| Preferred application:<br>As for 500, but for applications, where the substrate is a mixture of a silicate and a metal oxide. The substrate can be homogeneous or patterned. |

| 506 |
|---|
| 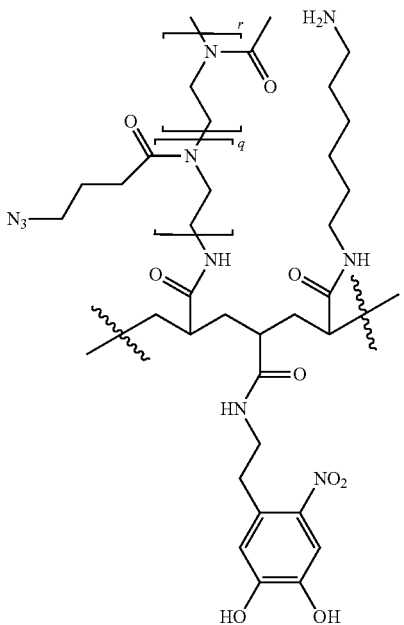 |
| Preferred application:<br>As for 500, but for applications, where the substrate is a metal oxide, especially an early transition metal oxide (TiO$_2$, ZrO$_2$, Ta$_2$O$_5$, Nb$_2$O$_5$), iron oxide, ZnO or alumina. This polymer would be especially well suited to coat magnetic iron oxide nanoparticles. This polymer would be especially well suited to coat biosensors with a high refractive index surface coating such as Ta$_2$O$_5$, Nb$_2$O$_5$. |

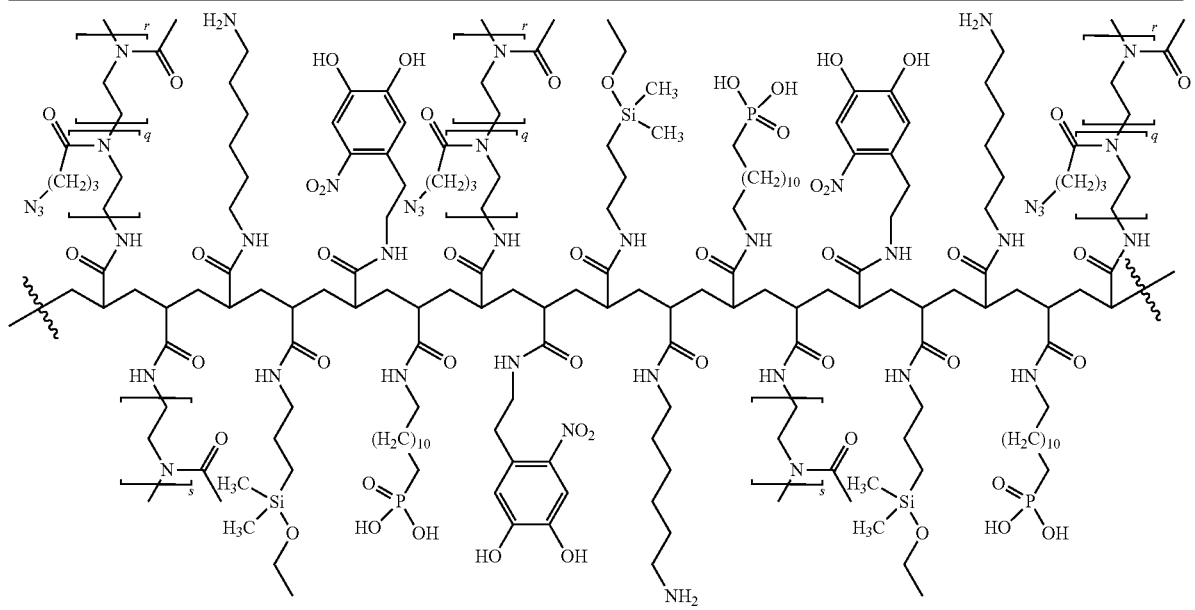

wherein q, r, and s are independent from each other 5 to 1000, preferably 40 to 1000.

A further aspect of the present invention relates to a conjugate of a copolymer comprising the monomer units according to the present invention and at least one active moiety selected from a therapeutic moiety and a targeting moiety. Suitable therapeutic moieties include, but are not limited to, antigens, antigen epitopes, therapeutic antibodies, chemotherapeutics, nucleic acids, and any combinations thereof. In certain preferred embodiments, the therapeutic moiety is an antigen (e.g., a tumor antigen, a viral antigen or a bacterial antigen) or an antigen epitope (e.g., a tumor antigen epitope, a viral antigen epitope or a bacterial antigen epitope). Within the context of the present invention, a targeting moiety stands for a moiety which recognizes a cell surface antigen or binds to a receptor on the surface of the target cell. The term includes inter alia vaccines, in particular mRNA vaccines such as mRNA vaccines against covid-19.

A further aspect of the present invention relates to the use of the copolymer according to the present invention as coating agent. Due to their hydrophilicity, the copolymers according to the present invention have an outstanding protein resistance and therefore, such a coating can be used to increase the protein resistance of a surface. Furthermore, they can be selectively functionalized via alkyne click chemistry especially via SPAAC (strain promoted alkyne-azide click chemistry) which allows to modify them further, for example by reaction with dibenzocyclooctyne-biotin (DBCO-Biotin) followed by selective streptavidin binding. The coating can be applied by dipping the surface to be protected into a solution comprising the copolymer and subsequent rinsing and drying.

FIGURES

EXAMPLES

Preparation of methyl-4-azidobutanoate

Figure 1:
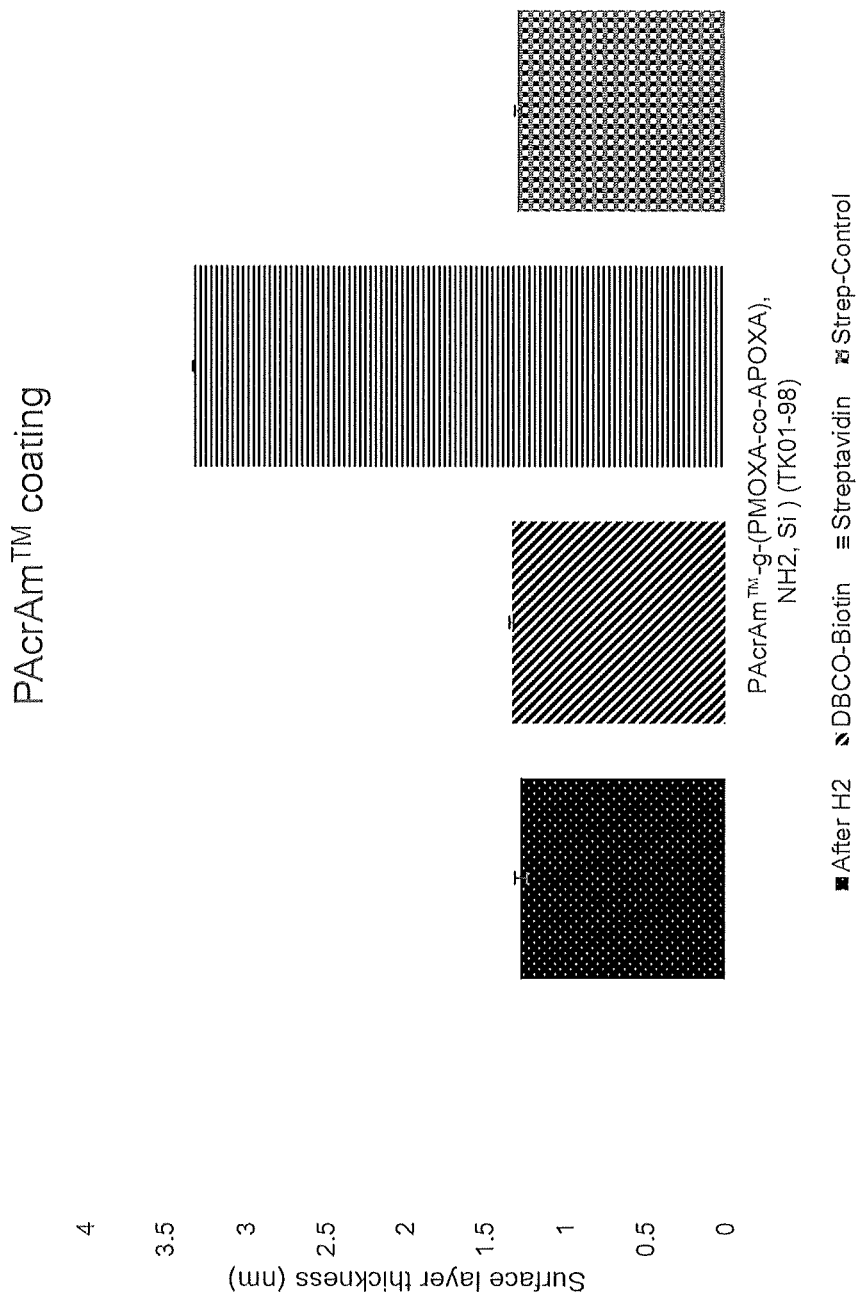
FIG. 1 shows a polymer comprising a copolymer according to the present invention successfully coated on a silicon oxide surface.

To a solution of methyl-4-Bromobutanoate (35.95 g, 0.20 mol) in dimethylformamide (200 ml) was added sodium azide (32.32 g, 0.50 mol). The resulted mixture was stirred at 60° C. for 17 h under argon. Then ultrapure water (460 ml) was added to the mixture. The resulted solution was extracted with diethyl ether three times. The combined organic phases were washed with ultrapure water and brine, dried over $MgSO_4$ and concentrated by evaporation to yield 24.14 g methyl-4-azidobutanoate as a yellow oil. Yield: 84.9% $^1$HNMR (400 MHz, $CDCl_3$) δ 3.71 (s, 3H), 3.37 (t, 2H, J=6.7 Hz), 2.44 (t, 2H, J=7.3 Hz) 1.93 (p, 2H, 7 Hz) ppm.

Preparation of 4-azidobutanoic acid

To a solution of methyl-4-azidobutanoate (24.14 g, 0.17 mol) in methanol (130 ml) was added 6M NaOH solution (60 ml, 0.36 mol). The resulted mixture was stirred at room temperature for 21 h. Then 2M HCl (270 ml, 0.52 mol) was added to the mixture. The resulted solution was extracted with dichloromethane three times. The combined organic phases were dried over $MgSO_4$ and concentrated by evaporation to yield 20.46 g 4-azidobutanoic acid as a yellow oil. Yield: 94% $^1$HNMR (400 MHz, $CDCl_3$) δ 3.38 (t, 2H, J=6.7 Hz), 2.48 (t, 2H, J=7.25), 1.92 (p, 2H, J=6.85).

Preparation of 4-azidobutanoyl chloride

To 4-azidobutanoic acid (20.29 g, 0.16 mol) was added thionyl chloride (13.9 ml, 0.19 mol) dropwise under nitrogen. The resulted mixture was stirred at room temperature for 1.5 h. Excessive thionyl chloride was removed by evaporation to purify the intermediate 4-azidobutanoyl chloride. $^1$HNMR (400 MHz, CDCl$_3$) δ 3.42 (t, 2H, J=6.48 Hz), 3.04 (t, 2H, J=7.08 Hz), 2.00 (p, 2H, J=6.95)

Preparation of N-2-Chloroethyl-4-azidobutyramide

To a solution of 4-azidobutanoyl chloride (23.19 g, 0.16 mol) in dichloromethane (175 ml) was added 2-Chloroethylamine (20.05 g, 0.17 mol) under nitrogen. Then triethylamine (54.8 ml, 0.39 mol) was added dropwise while cooling with an ice bath. The mixture was stirred at room temperature for 64 h. The resulted mixture was washed with diethyl ether and the supernatant was filtered and concentrated by evaporation to afford 14.3 g N-2-Chloroethyl-4-azidobutyramide as a yellow-brown oil. Yield: 47.7% $^1$HNMR (400 MHz, CDCl$_3$) δ 3.62 (m, 4H), 3.37 (t, 2H, J=6.52 Hz), 2.32 (t, 2H, J=7.22 Hz), 1.95 (p, 2H, J=6.88 Hz) ppm.

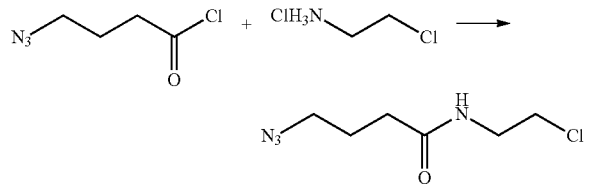

Preparation of 2-(3-Azidopropyl)-4,5-dihydro-1,3-oxazole (APOXA)

To a solution of N-2-Chloroethyl-4-azidobutyramide (13.52 g, 0.07 mol) in dry MeOH (45 ml) was added a solution of KOH (3.79 g, 0.068 mol) in dry MeOH (22 ml) under nitrogen. The resulted mixture was stirred at 50° C. for 15 h. Then the solution was cooled to room temperature and filtered. The solvent was removed by evaporation. The resulted mixture was dissolved in dichloromethane (100 ml) and filtered through celite. The solvent was removed by evaporation to yield 9.9 g 2-(3-Azidopropyl)-4,5-dihydro-1,3-oxazole. Yield: 91% $^1$HNMR (400 MHz, CDCl$_3$) δ 4.13 (t, 2H, J=9.52 Hz), 3.73 (t, 2H, J=9.48 Hz), 3.28 (t, 2H, J=6.73 Hz), 2.26 (t, 2H, J=7.32 Hz), 1.83 (p, 2H, J=7.02 Hz) ppm.

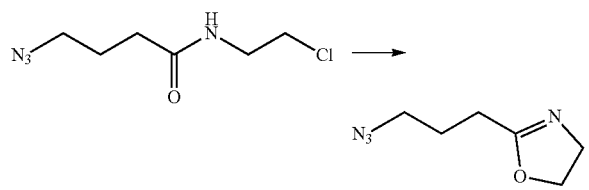

Preparation of N-2-chloroethyl-3-azidopropionamide

Azido propionic acid NHS is dissolved in dichloromethane. 1.5 equivalent of 1-Chloro ethylamine hydrochloride was added and the mixture is cooled to 0° C. using an ice bath. 2.5 eq of triethylamine is added dropwise at 0° C. and then the mixture is warmed to room temperature and stirred for 16 h at room temperature during which time triethylamine hydrochloride precipitates. Water was added to the mixture and the organic phase is collected, washed with HCl, a saturated NaHCO$_3$ solution, a saturated NaCl solution, dried with MgSO$_4$ and evaporated to dryness to obtain N-2-chloroethyl-3-azidpropionamide as a yellow oil. Yield: 76% $^1$HNMR (400 MHz, DMSO-d$_6$) δ 8.29 (s, 1H), 3.61 (t, 2H, J=6.10 Hz), 3.51 (t, 2H, J=6.36 Hz), 3.40 (q, 2H, J=5.99 Hz) ppm.

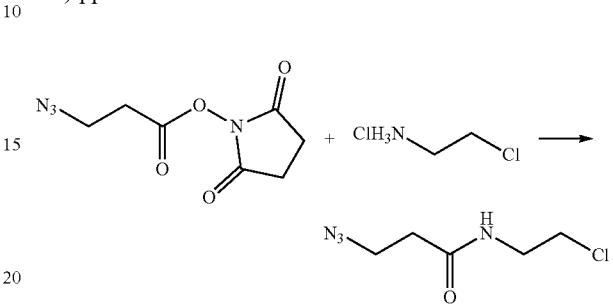

Preparation of 2-(2-Azidoethyl)-4,5-dihydro-1,3-oxazole (AEOXA)

2-(2-Azidoethyl)-4,5-dihydro-1,3-oxazole is synthesized equivalent to 2-(3-Azidopropyl)-4,5-dihydro-1,3-oxazole starting from 1-Chloro ethylamine hydrochloride and Azidopropanoic acid NHS.
$^1$HNMR (400 MHz, CDCl$_3$) 4.25 (t, 2H, J=9.54 Hz), 3.84 (t, 2H, J=9.48 Hz), 3.58 (t, 2H, J=6.78 Hz), 2.54 (t, 2H, J=6.82 Hz) ppm.
$^{13}$CNMR (400 MHz, CDCl$_3$) 166.72, 67.90, 54.88, 48.06, 28.43 ppm
IR, v/cm$^{-1}$: 2105 (azide)

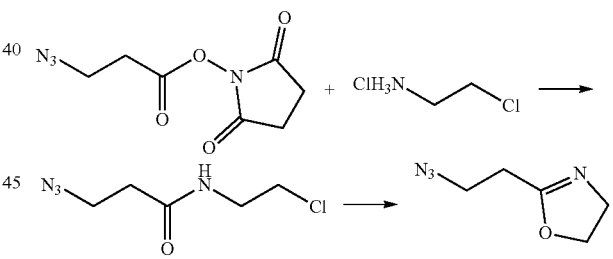

Preparation of 2-(2-Azidoethyl)-5,6-dihydro-4H-1,3-oxazine 2-(2-Azidoethyl)-5,6-dihydro-4H-1,3-oxazine is synthesized equivalent to 2-(3-Azidopropyl)-4,5-dihydro-1,3-oxazole starting from 1-Bromo propylamine hydrobromide and Azidopropanoic acid NHS.

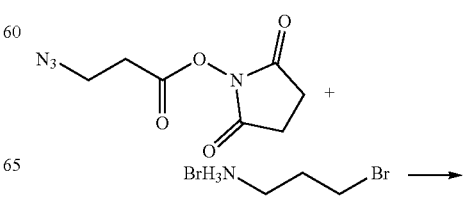

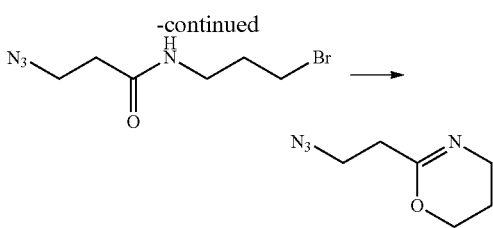

Preparation of 2-(3-Azidopropyl)-5,6-dihydro-4H-1,3-oxazine 2-(3-Azidopropyl)-5,6-dihydro-4H-1,3-oxazine is synthesized following the protocol for 2-(3-Azidopropyl)-4,5-dihydro-1,3-oxazole. Instead of 1-chloroethylamine hydrochloride, 1-chloro-propylamine hydrochloride is used.

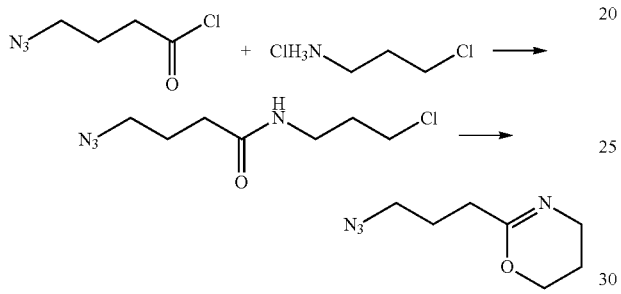

Preparation of 2-(Axidodifluoromethyl)-4,5-dihydro-1,3-oxazole

Sodium azide (1.2 eq) is added to a stirred solution of 2-bromo-2,2-difluoroacetate in DMSO. After stirring at room temperature for 18 h, the mixture is poured into water and extracted with dichloromethane. The combined extracts were washed with water, dried with MgSO$_4$, filtered and dichloromethane was evaporated using a rotary evaporator. The product was distilled at 133 mbar at a boiling point of 86° C. to obtain pure ethyl difluoroazidoacetate.

Ethyl difluoroazidoacetate was dissolved in DMF, cooled to 0° C. and 1 equivalent of 1-bromo-ethylamine hydrobromide was added. After addition of 2.2 equivalents of triethylamine, the reaction mixture was stirred first at 0° C. for 1 h and then at room temperature for 20 h. The intermediate N-2-Bromoethylazidodifluoroacetamide is not isolated and cyclized spontaneously. After distillation at reduced pressure, 2-(Azidodifluoromethyl)-4,5-dihydro-1,3-oxazole was obtained as a colorless liquid.

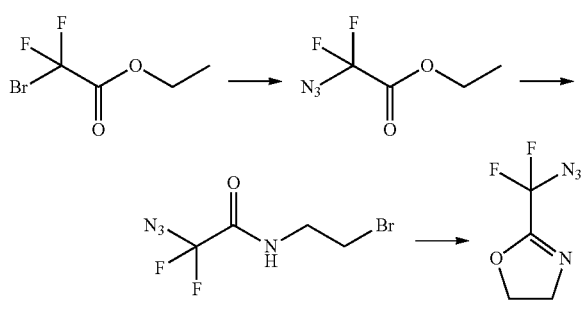

Preparation of 2-(Azidodifluoromethyl)-5,6-dihydro-4H-1,3-oxazine

Ethyl difluoroazidoacetate was dissolved in DMF, cooled to 0° C. and 1 equivalent of 1-bromo-propylamine hydrobromide was added. After addition of 2.2 equivalents of triethylamine, the reaction mixture was stirred first at 0° C. for 1 h and then at room temperature for 20 h. The intermediate N-2-Bromopropylazidodifluoroacetamide is not isolated and cyclized spontaneously. After distillation at reduced pressure, 2-(Azidodifluoromethyl)-5,6-dihydro-4H-1,3-oxazine was obtained as a colorless liquid.

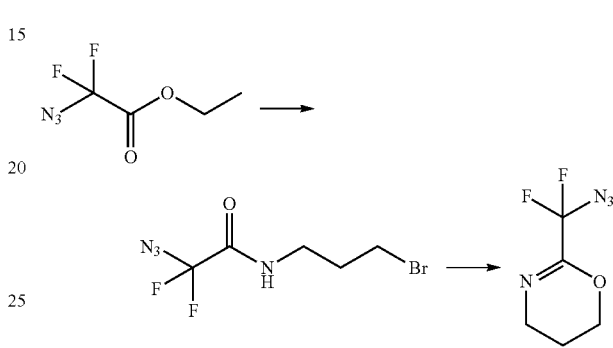

Preparation of 2-(Azidofluoromethyl)-4,5-dihydro-1,3-oxazole 2-(Azidofluoromethyl)-4,5-dihydro-1,3-oxazole can be synthesized analog to 2-(Azidodifluoromethyl)-4,5-dihydro-1,3-oxazole starting from Ethyl bromofluoroacetate.

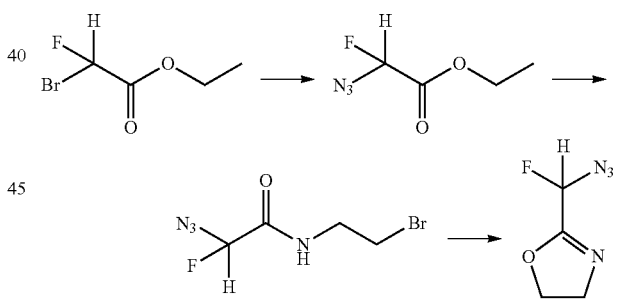

Preparation of 2-(Azidofluoromethyl)-5,6-dihydro-4H-1,3-oxazine 2-(Azidofluoromethyl)-5,6-dihydro-4H-1,3-oxazine can be synthesized analog to 2-(Azidodifluoromethyl)-5,6-dihydro-4H-1,3-oxazine starting from Ethyl bromofluoroacetate.

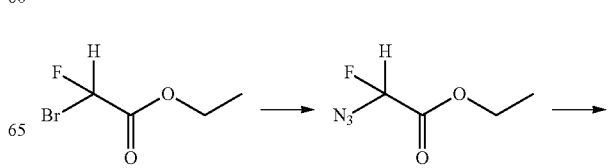

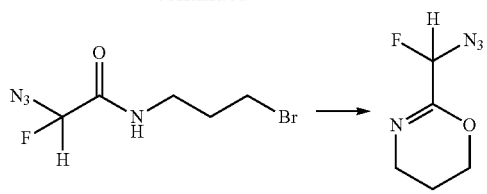

Preparation of 2-(4-Azido-2,3,5,6-tetrafluorophenyl)-4,5-dihydro-1,3-oxazole 4-Azido-2,3,5,6-tetrafluorobenzoic acid-NHS is reacted with 1.1 equivalent of 1-bromo-ethylamine hydrobromide and 1.1 eq of triethylamin in ethanol at room temperature for 24 h. After removal of the solvent with a rotary evaporator, the intermediate N-3-Bromoethyl-4-azido-2,3,5,6-tetrafluorobenzamide is obtained as a yellow oil. The crude oil is dissolved in methanol and 1.1 eq of KOH is added. After stirring for 24 h at room temperature, the solution is filtered, evaporated to dryness and the product recrystallized in hexane to obtain 2-(4-Azido-2,3,5,6-tetrafluorophenyl)-4,5-dihydro-1,3-oxazole as a white powder.

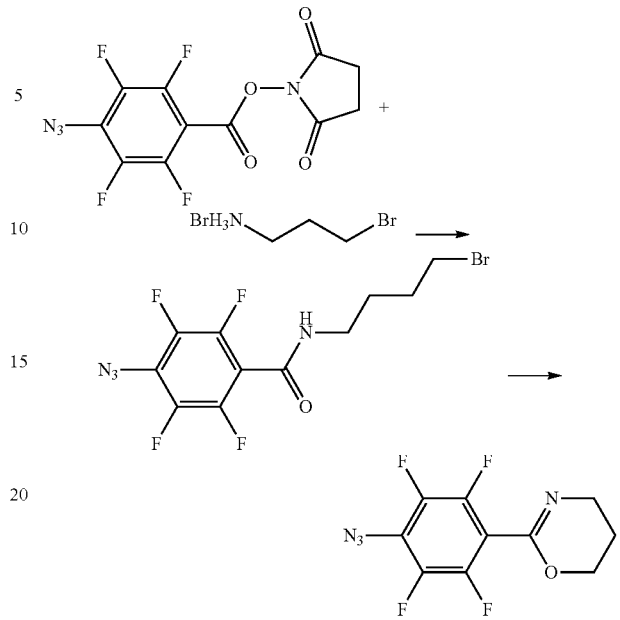

Preparation of 2-(4-Azido-2,3,5,6-tetrafluorophenyl)-5,6-dihydro-4H-1,3-oxazine 2-(4-Azido-2,3,5,6-tetrafluorophenyl)-5,6-dihydro-4H-1,3-oxazine can be obtained analog to 2-(4-Azido-2,3,5,6-tetrafluorophenyl)-4,5-dihydro-1,3-oxazole using 1-bromo-propylamine hydrobromide instead of 1-bromo-ethylamine hydrobromide.

Preparation of 2-(2-Azidobutyl)-4,5-dihydro-1,3-oxazole (ABOXA)

2-(2-Azidobutyl)-4,5-dihydro-1,3-oxazole is synthesized equivalent to 2-(2-Azidopropyl)-4,5-dihydro-1,3-oxazole starting from 1-Chloro ethylamine hydrochlorid and Azidopentanoicoic acid NHS. Yield: 42.8% $^1$HNMR (400 MHz, DMSO-$d_6$) δ 4.18 (t, 2H, J=9.75 Hz), 3.78 (t, 2H, J=9.76 Hz), 3.25 (t, 2H, J=6.68 Hz), 2.25z (t, 2H, J=7.30 Hz), 1.72-1.56 (m, 4H) ppm.

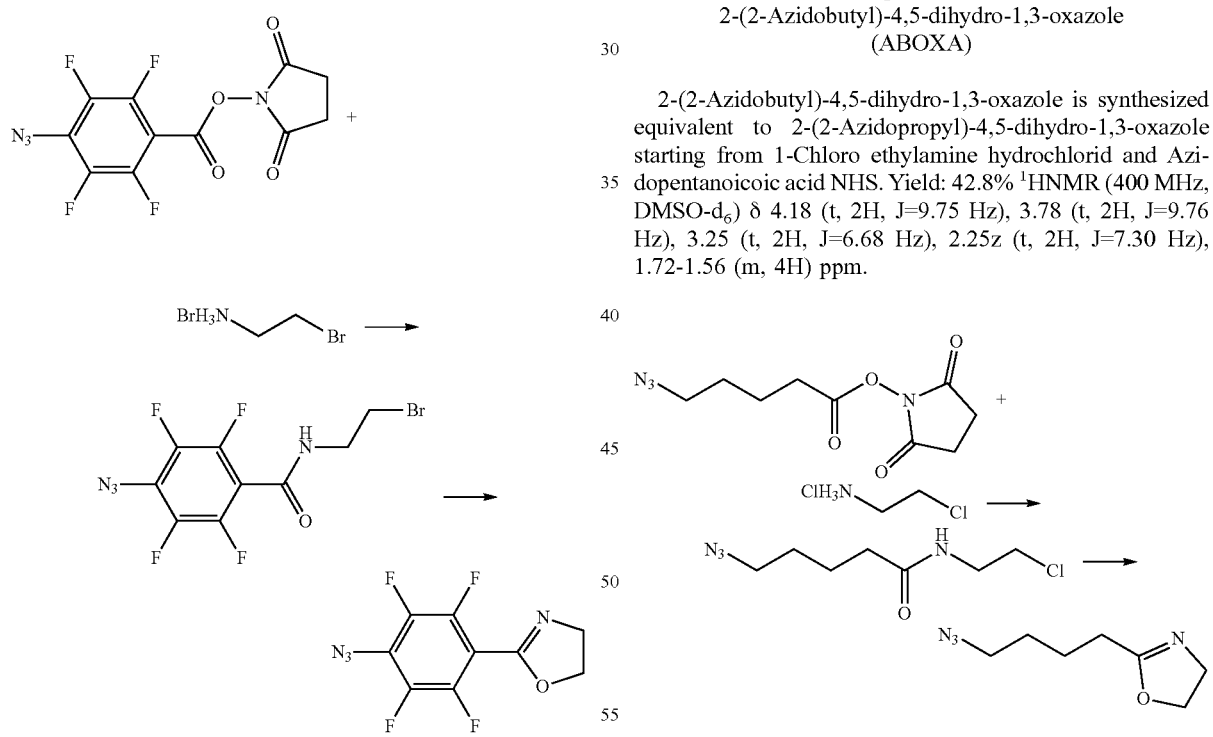

Preparation of Poly(MOXA-Co-APOXA)-Amine with 10% APOXA Content DP=50

To a solution of 2-methyl-4,5-dihydrooxazole (4.61 g, 54.2 mmol) and 2-(3-azidopropyl)-4,5-dihydro-1,3-oxazole (0.93 g, 6.02 mmol) in dry acetonitrile (17 ml) was added methyl trifluoromethanesulfonate (0.1975 g, 1.2 mmol) under nitrogen. The solution was stirred at 70° C. for 20 h. The resulting solution was cooled to room temperature. Then Bis(trimethylsilyl)amine (0.5828 g, 3.6 mmol) was added to terminate the reaction. The solution was stirred at room temperature for 23 h. The polymer was precipitated in diethyl ether (150 ml). The supernatant was removed and the polymer dried by evaporation. After dissolving in mQ-water (25 ml) Silicagel (7.5 g) and 2N HCl (2.17 ml) was added to the polymer solution. The mixture was stirred for 23 h at room temperature. The supernatant was filtered and lyophilized to yield 4.00 g poly(MOXA-co-APOXA)-amine as a white solid. Yield: 47.6% 1HNMR (400 MHz, D2O) 3.7-3.47 (m, 300H), 3.44-3.34 (m, 15H), 3.11-2.91 (m, 3H), 2.60-2.35 (m, 15H), 2.20-1.93 (m, 220H), 1.91-1.79 (m, 15H) ppm.

Synthesis of Poly(MOXA-Co-APOXA)-Amine with 10% APOXA Content DP=100

This polymer was synthesized equivalent to poly(MOXA-co-APOXA)-amine with 10% APOXA content DP=50 by changing the ratio of total monomer to methyl trifluoromethanesulfonate initiator ratio to 100:1.

Synthesis of Poly(MOXA-Co-ABOXA)-Amine with 10% ABOXA Content and a DP=50

To a solution of 2-methyl-4,5-dihydrooxazole (3.60 g, 42.3 mmol) and 2-(4-azidobutyl)-4,5-dihydro-1,3-oxazole (0.79 g, 4.70 mmol) in dry acetonitrile (13 ml) was added methyl trifluoromethanesulfonate (0.1543 g, 0.94 mmol) under nitrogen. The solution was stirred at 70° C. for 16 h. The resulting solution was cooled to room temperature. Then Bis(trimethylsilyl)amine (0.4552 g, 2.8 mmol) was added to terminate the reaction. The solution was stirred at room temperature for 23 h. The polymer was precipitated in diethyl ether (150 ml). The supernatant was removed and the polymer dried by evaporation. After dissolving in mQ-water (30 ml) Silicagel (13 g) and 2N HCl (2.8 ml) was added to the polymer solution. The mixture was stirred for 23 h at room temperature. The supernatant was filtered and lyophilized to yield 1.62 g poly(MOXA-co-APOXA)-amine as a white solid. Yield: 32.3% 1HNMR (400 MHz, D2O) 3.85-3.38 (m, 260H), 3.38-3.34 (m, 18H), 3.09-2.90 (m, 3H), 2.52-2.89 (m, 15H), 2.20-1.92 (m, 180H), 1.73-1.53 (m, 28H) ppm.

Synthesis of Poly(MOXA-Co-ABOXA)-Amine with 10% APOXA Content DP=100

This polymer was synthesized equivalent to poly(MOXA-co-ABOXA)-amine with 10% ABOXA content DP=50 by changing the ratio of total monomer to methyl trifluoromethanesulfonate initiator ratio to 100:1.

Synthesis of Poly(MOXA-b-APOXA)-Amine

To a solution of 2-methyl-4,5-dihydrooxazole (4.61 g, 54.2 mmol) in dry acetonitrile (17 ml) was added methyl trifluoromethanesulfonate (0.1975 g, 1.2 mmol) under nitrogen. The solution was stirred at 70° C. for 20 h. Then 2-(3-Azidopropyl)-4,5-dihydro-1,3-oxazole (0.93 g, 6.02 mmol) was added to the solution under nitrogen. The solution was stirred at 70° C. for 20 h. The resulting solution was cooled to room temperature. Then Bis(trimethylsilyl) amine (0.5828 g, 3.6 mmol) was added to terminate the reaction. The solution was stirred at room temperature for 23 h. The polymer was precipitated in diethyl ether (150 ml). The supernatant was removed and the polymer dissolved in mQ-water (25 ml). To the polymer solution was added Silicagel (7.5 g) and 2N HCl (2.17 ml). The mixture was stirred for 23 h at room temperature. The supernatant was filtered and lyophilized to yield poly(MOXA-b-APOXA)-amine.

Synthesis of PAcrAm™-g-(poly(MOXA-co-APOXA), NH$_2$, Si)

A solution of poly(MOXA-co-APOXA)-amine (500 mg, 0.07 mmol) in dimethylformamide (5 ml) was added to a solution of poly(pentafluorophenyl acrylate) (171.8 mg, 0.0071 mmol) in DMF (1.7 ml) and triethylamine (10.7 µl, 0.08 mmol). The solution was stirred at 50° C. for 18 h. After the addition of a solution of N-Boc-1,6-hexanediamine (82 mg, 0.32 mmol) and triethylamine (90 µl, 0.65 mmol) in DMF (0.82 ml) the solution was stirred at 50° C. for additional 23 h. Then a solution of 3-(ethoxydimethylsilyl) propylamine (104.7 mg, 0.65 mmol) triethylamine (181 µl, 1.3 mmol) in DMF (1.05 ml) and was added and the solution stirred at 50° C. for additional 30 h. The resulted mixture was concentrated by evaporation, followed by dissolving in dichloromethane (4.45 ml). To the solution was added trifluoroacetic acid (1.11 ml 14.4 mmol). The solution was stirred at room temperature for 19 h. The solvent was removed by evaporation. The resulted brown oil was washed with diethyl ether (15 ml) three times. The brown oil was concentrated by evaporation, followed by dissolving in ultrapure water (15 ml). The solution was dialyzed against ultrapure water, filtered (0.22 µm) and lyophilized to yield 326.96 mg PAcrAm™-g-(poly(MOXA-co-APOXA), NH$_2$, Si) as a white solid. $^1$HNMR (400 MHz, D2O) 3.75-3.46 (m, 3000H), 3.45-3.33 (m, 150H), 3.14-2.91 (m, 30H), 2.58-2.36 (m, 150H), 2.28-1.92 (m, 2200H), 1.92-1.82 (m, 150H), 1.74-1.28 (m, 300H), 0.16 (s, 270H) ppm.

Coating Experiments on Silicon-Oxide Wafer:

Silicon oxide wafers were cleaned with oxygen plasma for 2 minutes. The wafers were immersed each in 1 ml of a solution of 0.5 mg/ml PAcrAm™-g-(poly(MOXA-co-APOXA), NH$_2$, Si) in HEPES 0 for 30 min. The wafers were washed with mQ-water and blow-dried with nitrogen. The wafers were immersed in a HEPES 2 solution for 15 h, washed with mQ-water and blow-dried with nitrogen. Then the first half of the wafers were immersed in 0.1 mM solution of DBCO-Biotin (DBCO=Dibenzocyclooctyne) in HEPES 2 for 1 h followed by washing with mQ-water and blow-drying with nitrogen. These wafers and the other half of the coated wafers were then immersed in a 0.1 mg/ml solution of streptavidin in HEPES 2 for 30 min.

As shown in FIG. 1, the polymer was successfully coated on a silicon oxide surface. This coating showed a sufficient stability to retain 1.29 nm adlayer thickness after ageing in a polar buffer solution (H2). The coating's azide groups were successfully utilised to modify the surface with DBCO-Biotin via strain promoted azide alkyne click reaction. This enabled the functionalisation of the surface with the protein streptavidin, which was confirmed with an increase in adlayer thickness to 3.34 rm. The specificity of this reaction was proven by the inability of streptavidin to adsorb on the surface without a previous functionalisation with DBCO-Biotin, where the adlayer thickness remained at 1.29 nm.

Synthesis of PAcrAm™-g-(poly(MDXA-co-APOXA), NH$_2$, ND)

A solution of poly(MOXA-co-APOXA)-amine (300 mg, 0.06 mmol) in dimethylformamide (3 ml) was added to a solution of poly(pentafluorophenyl acrylate) (101.3 mg, 0.0041 mmol) in DMF (1 ml) and triethylamine (35 µl, 0.26 mmol). The solution was stirred at 50° C. for 18 h. After the addition of a solution of N-Boc-1,6-hexanediamine (45.7 mg, 0.18 mmol) and triethylamine (50 µl, 0.36 mmol) in DMF (0.46 ml) the solution was stirred at 50° C. for 23 h. Then a solution of nitro-dopamine (107.2 mg, 0.36 mmol) and triethylamine (151.2 µl, 1.08 mmol) in DMF (1.07 ml) was added and the solution stirred at 50° C. for 22 h. The resulted mixture was concentrated by evaporation. Water (1.8 ml) and trifluoroacetic acid (1.8 ml 23.36 mmol) were added to the mixture. The solution was stirred at room temperature for 20.5 h. The solvent was removed by evaporation, followed by mixing with ultrapure water (3.5 ml). The mixture was dialyzed against ultrapure water, filtered (0.22 µm) and lyophilized to yield 326.96 mg PAcrAm™-g-(poly(MOXA-co-APOXA), NH2, ND) as a brownish-orange solid. $^1$HNMR (400 MHz, $D_2O$) 3.75-3.46 (m, 5080H), 3.45-3.33 (m, 150H), 3.14-2.91 (m, 30H), 2.58-2.36 (m, 150H), 2.28-1.92 (m, 3429H), 1.92-1.82 (m, 150H), 1.74-1.28 (m, 300H) ppm.

Synthesis of
PAcrAm™-g-(poly(MOXA-co-ABOXA), $NH_2$, ND)

A solution of poly(MOXA-co-ABOXA)-amine (500 mg, 0.09 mmol) in dimethylformamide (5 ml) was added to a solution of poly(pentafluorophenyl acrylate) (141.3 mg, 0.59 mmol) in DMF (1.4 ml) and triethylamine (49 µl, 0.36 mmol). The solution was stirred at 50° C. for 18 h. After the addition of a solution of N-Boc-1,6-hexanediamine (63.7 mg, 0.25 mmol) and triethylamine (70 µl, 0.5 mmol) in DMF (0.64 ml) the solution was stirred at 50° C. for 23 h. Then a solution of nitro-dopamine (149.4 mg, 0.50 mmol) and triethylamine (211 µl, 1.51 mmol) in DMF (1.49 ml) was added and the solution stirred at 50° C. for 20 h. The resulted mixture was concentrated by evaporation. Water (3 ml) and trifluoroacetic acid (3 ml 38.94 mmol) were added to the mixture. The solution was stirred at room temperature for 20.5 h. The solvent was removed by evaporation. The brown oil was concentrated by evaporation, followed by mixing in ultrapure water (15 ml). The mixture was dialyzed against ultrapure water, filtered (0.22 µm) and lyophilized to yield 135.79 mg PAcrAm™-g-(poly(MOXA-co-ABOXA), $NH_2$, ND) as a brownish-orange solid. $^1$HNMR (400 MHz, $D_2O$) 3.82-3.41 (m, 3900H), 3.41-3.28 (m, 188H), 3.14-2.89 (m, 85H), 2.53-2.31 (m, 135H), 2.26-1.94 (m, 2838H), 1.73-1.25 (m, 460H) ppm.

Coating Experiments on Gold Wafer Comparing PAcrAm™-g-(Poly(MOXA-Co-ABOXA), $NH_2$, ND), PAcrAm™-g-(Poly(MOXA-Co-APOXA), $NH_2$, ND) and PAcrAm™-g-(poly(MOXA), $NH_2$, ND):

Gold wafers were cleaned with oxygen plasma for 2 minutes followed by immersion in Ethanol for 10 minutes and blow dried with nitrogen.

Polymer Self Assembly on Gold Wafers:

The wafers were immersed each in either a solution of
1. 0.5 mg/ml PAcrAm™-g-(poly(MOXA-co-APOXA), $NH_2$, ND),
2. 0.5 mg/ml PAcrAm™-g-(poly(MOXA-co-ABOXA), $NH_2$, ND),
3. 0.5 mg/ml PAcrAm™-g-(poly(MOXA), $NH_2$, ND),
4. 1.0 mg/ml PAcrAm™-g-(poly(MOXA-co-APOXA), $NH_2$, ND) or
5. 1.0 mg/ml PAcrAm™-g-(poly(MOXA-co-ABOXA), $NH_2$, ND)

in HEPES 0 for 18.5 h at room temperature. The wafers were washed with mQ-water and blow-dried with nitrogen.

Stability Testing:

The coated wafers were immersed in a
HEPES 2 solution (10 mM HEPES, 150 mM NaCl) or
NaCl solution (2 M)

for 15 h, washed with mQ-water and blow-dried with nitrogen.

Figure 2:
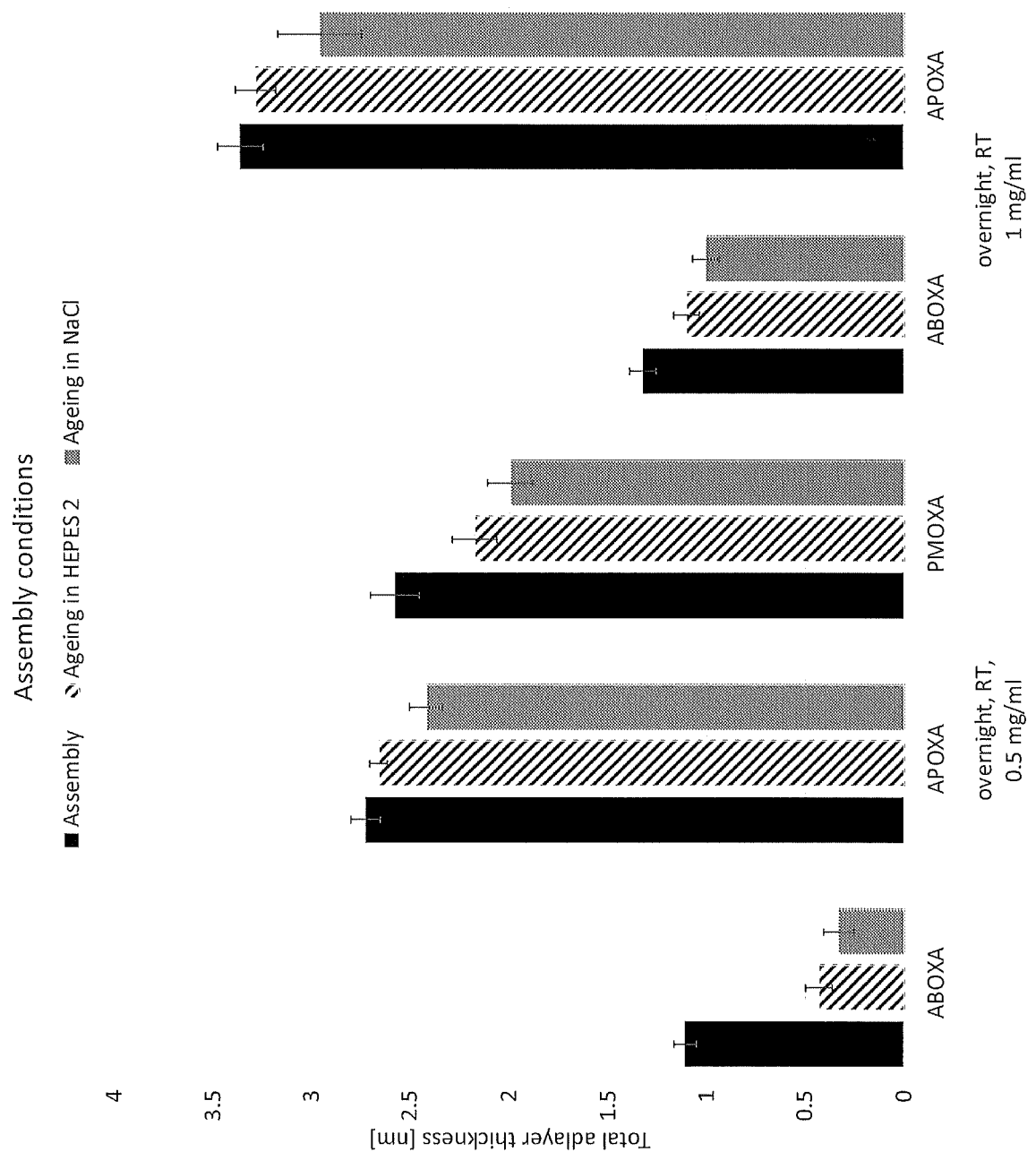
FIGS. 2, 3A and 3B show a comparison between the copolymer of the present invention and a copolymer of the state of the art.

As shown in FIG. 2, when immersed at 0.5 mg/mL PAcrAm™-g-(poly(MOXA-co-ABOXA), $NH_2$, ND) has the thinnest adlayer thickness of 1.1 nm while both PAcrAm™-g-(poly(MOXA-co-APOXA), $NH_2$, ND) and PAcrAm™-g-(poly(MOXA), $NH_2$, ND) form adlayers exceeding 2 nm. After immersion in HEPES 2 or NaCl the adlayer thickness drops below 0.5 nm in case of PAcrAm™-g-(poly(MOXA-co-ABOXA), $NH_2$, ND) while the other two polymers show a much higher resistance towards HEPES 2 and NaCl equal or bigger to 2 nm adlayer thickness.

It is known that generally a thicker layer improves the protein resistance of a coating, therefore experiments at higher concentration were conducted. When immersed at 1.0 mg/mL, the adlayer thickness for PAcrAm™-g-(poly(MOXA-co-ABOXA), $NH_2$, ND) direct after assembly and after ageing in HEPES 2 and NaCl did increases to bigger than 1 nm. At the same conditions (1.0 mg/ml) PAcrAm™-g-(poly(MOXA-co-APOXA), $NH_2$, ND) has a total adlayer thickness of above 2.5 nm. This clearly shows the superior properties of the APOXA containing polymer (n=3) over the ABOXA containing polymer (n=4), which is due to better solubility and smaller steric hindrance of the formed poly (MOXA-co-APOXA) brushes compared to the poly (MOXA-co-ABOXA) brushes leading to a denser and better packed coating.

Bio-Functional Testing:

Polymer coated gold wafers that were either aged in HEPES 2 or NaCl solution are used for this test. The samples are reacted via strain promoted azide-alkyne click chemistry (SPAAC) with DBCO-biotin (0.1 mM in HEPES 2) for 1 hours followed by immersion in a 0.1 mg/mL solution of streptavidin in HEPES 2 for 30 min.

The following 4 sets of coated PAcrAm™-g-(poly(MOXA-co-ABOXA), $NH_2$, ND) and PAcrAm™-g-(poly(MOXA-co-APOXA), $NH_2$, ND) samples were prepared and compared:
1. Aged in HEPES 2 and immersed in a DBCO-biotin solution
2. Aged in HEPES 2 only (Reference no biotin)
3. Aged in NaCl and immersed in a DBCO-biotin solution
4. Aged in NaCl only (Reference no biotin)

Figure 3A:
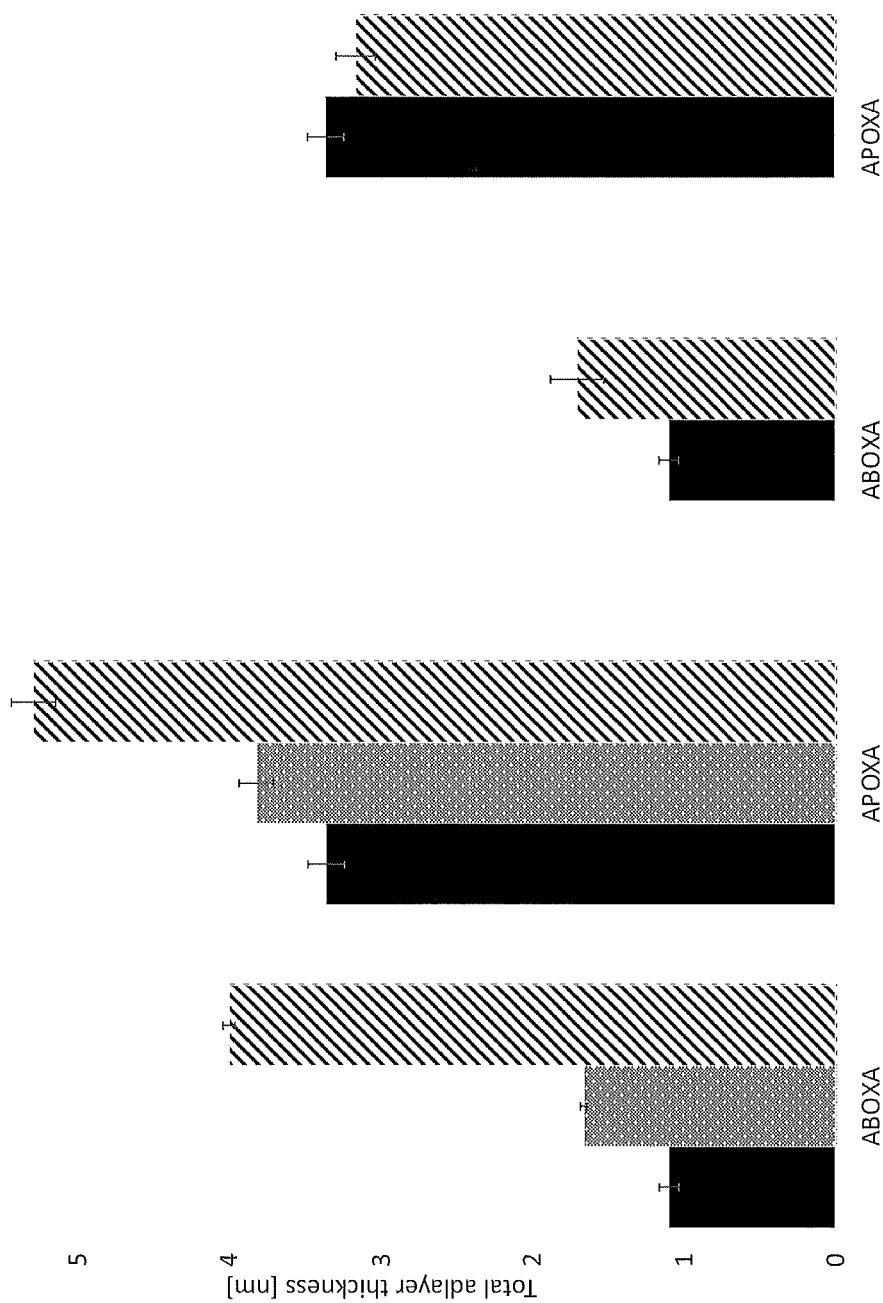

As shown in FIG. 3a (HEPES 2 aged samples), both polymers were successfully coated on a gold surface and remained with a significant adlayer thickness after ageing in HEPES 2. Both polymers react with DBCO-biotin as is shown by an increase of adlayer thickness of 0.51 nm for the ABOXA polymer and 0.55 nm for the APOXA polymer. After immersion in the streptavidin solution a further increase in adlayer thickness is observed with 2.34 nm for the ABOXA polymer and 1.47 nm for the APOXA polymer. When no DBCO-biotin was present, no increase in adlayer thickness is observed for the APOXA polymer while a significant non-specific binding of 0.66 nm of streptavidin is detected for the ABOXA polymer. This experiment shows the superior performance of the APOXA polymer with only specific targeted binding compared to the high non-specific binding of the ABOXA version.

Figure 3B:
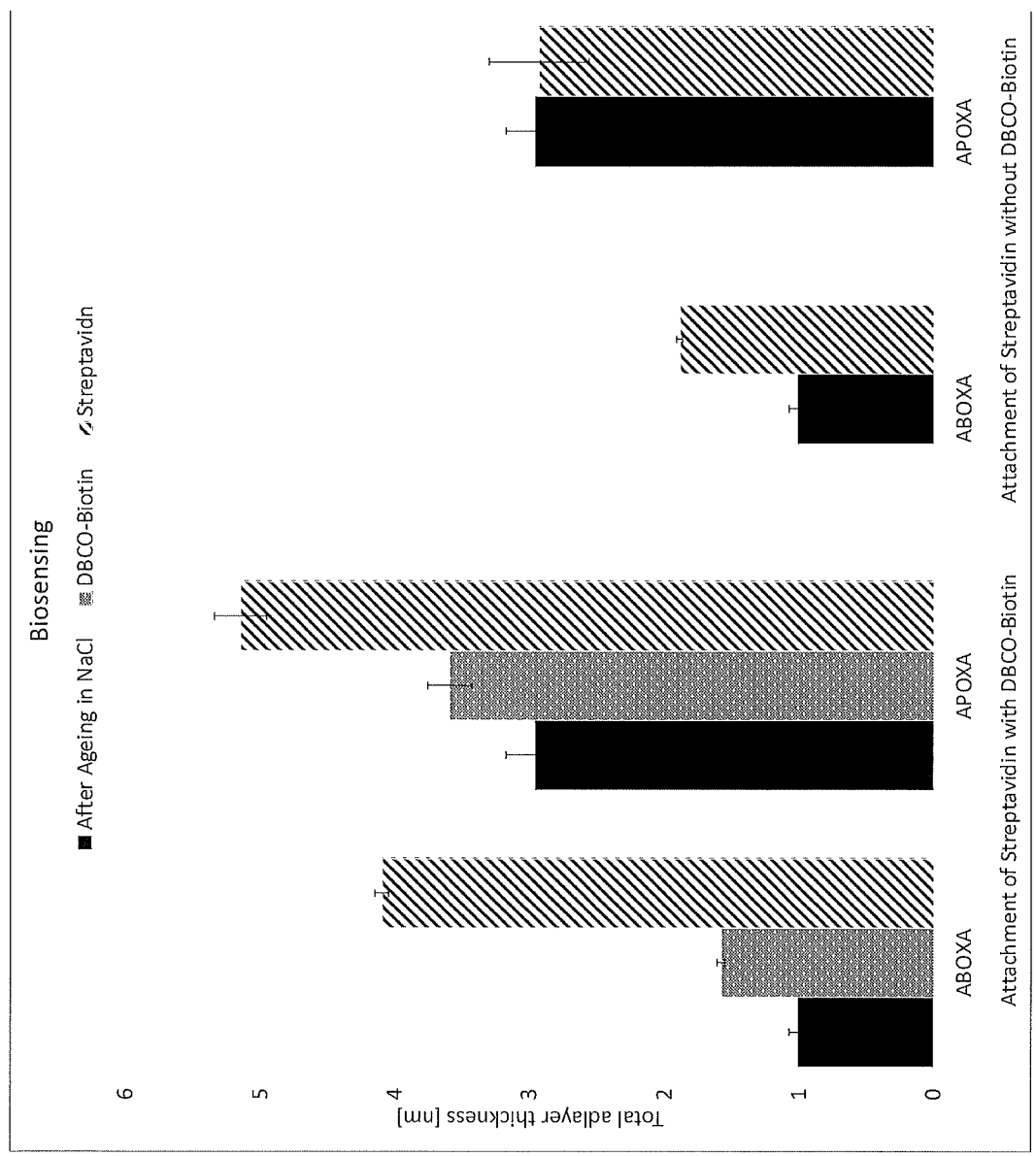

As shown in FIG. 3b (NaCl aged samples), both polymers were successfully coated on a gold surface and remained with a significant adlayer thickness after ageing in NaCl. Both polymers react with DBCO-biotin as is shown by an increase of adlayer thickness of 0.57 nm for the ABOXA polymer and 0.72 nm for the APOXA polymer. After immersion in the streptavidin solution a further increase in adlayer thickness is observed with 2.52 nm for the ABOXA polymer and 1.56 nm for the APOXA polymer. When no DBCO-biotin was present, no increase in adlayer thickness is observed for the APOXA polymer while a significant non-specific binding of 0.84 nm of streptavidin is detected for the ABOXA polymer. This experiment shows again the superior performance of the APOXA polymer with only specific targeted binding compared to the high non-specific binding of the ABOXA version.

Protein Resistance Testing:

Polymer coated gold wafers that were either aged in HEPES 2 or NaCl solution are used for this test. The following 6 sets of coated PAcrAm™-g-(poly(MOXA-co-ABOXA), NH$_2$, ND), PAcrAm™-g-(poly(MOXA-co-APOXA), NH$_2$, ND) and PAcrAm™-g-(poly(MOXA), NH$_2$, ND) samples were prepared and compared:

1. PAcrAm™-g-(poly(MOXA-co-ABOXA), NH$_2$, ND) coated aged in HEPES 2
2. PAcrAm™-g-(poly(MOXA-co-ABOXA), NH$_2$, ND) coated aged in NaCl
3. PAcrAm™-g-(poly(MOXA-co-APOXA), NH$_2$, ND) coated aged in HEPES 2
4. PAcrAm™-g-(poly(MOXA-co-APOXA), NH$_2$, ND) coated aged in NaCl
5. PAcrAm™-g-(poly(MOXA), NH$_2$, ND) coated aged in HEPES 2
6. PAcrAm™-g-(poly(MOXA), NH$_2$, ND) coated aged in NaCl
7. Bare Gold surface as reference All samples were immersed in full human serum for 30 min, washed first with HEPES 2 buffer followed by washing with ultrapure water. Protein resistance is expressed in % as reduction of protein uptake on polymer coated sample compared to uncoated reference sample.

Result:

|    | Polymer: | Ageing: | Protein resistance |
|----|----------|---------|--------------------|
| 1. | ABOXA    | HEPES 2 | 55 ± 18%           |
| 2. | ABOXA    | NaCl    | 46 ± 15%           |
| 3. | APOXA    | HEPES 2 | 94 ± 4.8%          |
| 4. | APOXA    | NaCl    | 91 ± 8.2%          |
| 5. | MOXA     | HEPES 2 | 98 ± 0.96%         |
| 6. | MOXA     | NaCl    | 97 ± 10.2%         |
| 7. | —        | —       | 0%                 |

This experiment again shows the superior performance of the APOXA (n=3) and MOXA (reference) polymers in respect to resistance to protein fouling compared to the ABOXA (n=4) polymer. The shorter (n=3) spacer in case of the APOXA polymer increases its hydrophilicity and reduces possible hydrophobic interactions with proteins leading to very low protein fouling (>90% protein resistance) close to the non-functionalized MOXA reference while the ABOXA version does show a significant fouling with proteins due to the longer more hydrophobic alkyl spacer group.

The invention claimed is:

1. A copolymer comprising at least a first and a second monomer unit, wherein:
the first and the second monomer unit are different from each other;
the first monomer unit is selected from the group consisting of compounds 202, 203, 204, 205, 206, 207, 302, 303, 304, 305, 306, and 307

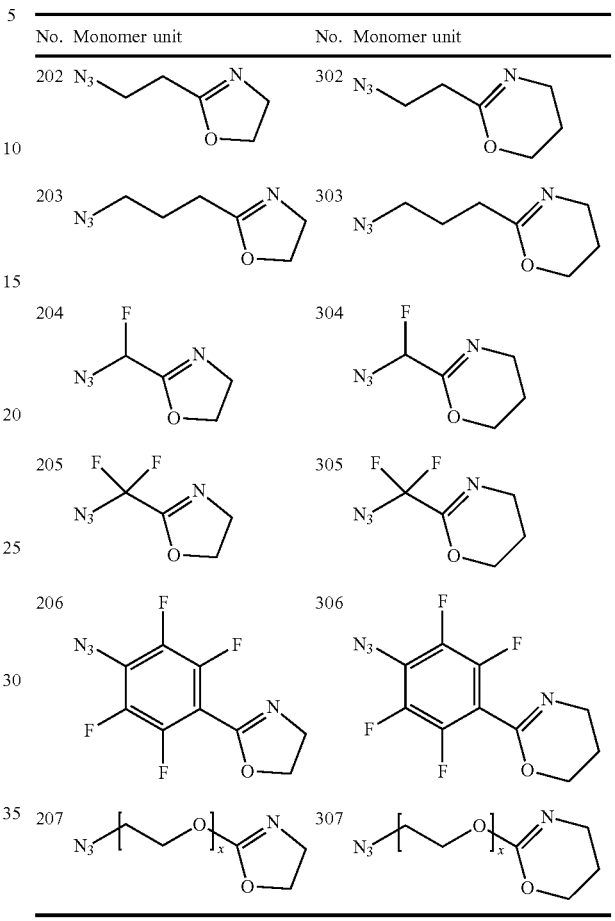

and the second monomer unit is selected from the group consisting of 2-methyl-4,5-dihydro-1,3-oxazole, 2-ethyl-4,5-dihydro-1,3-oxazole, 2-methyl-5,6-dihydro-4H-1,3-oxazine and 2-ethyl-5-6-dihydro-4H-1,3-oxazine with the proviso that
if the second monomer unit is 2-ethyl-4,5-dihydro-1,3-oxazole, the first monomer unit is selected from the group consisting of compounds 202, 204 and 205,
and if the second monomer unit is 2-ethyl-5-6-dihydro-4H-1,3-oxazine, the first monomer unit is selected from the group consisting of compounds 302, 304 and 305; and
the copolymer is protein resistant.

2. The copolymer according to claim 1, wherein the second monomer unit is 2-methyl-4,5-dihydro-1,3-oxazole.

3. The copolymer according to claim 1, wherein the second monomer unit is 2-methyl-5,6-dihydro-4H-1,3-oxazine.

4. The copolymer according to claim 1, wherein the first monomer unit is selected from the group consisting of compounds 202, 203, 204, 205, 302, 303, 304, and 305.

5. The copolymer according to claim 1, wherein the first monomer unit is selected from the group consisting of compounds 202, 203, 204, 205, and 206.

6. The copolymer according to claim 5, wherein the first monomer unit is compound 203.

7. The copolymer according to claim 5, wherein the copolymer comprises 1 to 30% of the first monomer unit and 70 to 99% of the second monomer unit.

8. The copolymer according to claim 1 comprising 25 to 150 monomer units in total.

9. The copolymer according to claim 1 further comprising a terminal linker group.

10. The copolymer according to claim 1, wherein the copolymer is hydrophilic.

11. The copolymer according to claim 1, wherein the copolymer is not amphiphilic.

12. A functional polymer comprising a polymer backbone and a plurality of side chains, wherein at least a part of said side chains are copolymers according to claim 1.

13. The functional polymer according to claim 12, wherein all side chains are said copolymers.

14. The functional polymer according to claim 12, wherein said functional polymer comprises at least two different types of side chains, and wherein at least one type of side chain is said copolymers.

15. The functional polymer according to claim 14, wherein said functional polymer comprises a further type of side chain D which is intended to reversible bind to a substrate or has a coating function, and the side chain D is selected from the group consisting of
- a short chain side chain D1 having a linear or branched, substituted or unsubstituted C1 to C12 alkylene group which optionally comprises heteroatoms selected from the group consisting of oxygen and nitrogen, and which carries at least one functional end or side group K1 selected from the group consisting of amines, carboxy, poly(propylene sulfide), and thioethers;
- a side chain D2 having a long chain D2 comprising more than 15 carbon or silicium atoms in the chain, wherein said long chain D2 is selected from the group consisting of polydimethylsiloxane, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide, poly(2-hydroxyethyl methacrylate), polyhydroxypropylmethacrylate), poly-(methacryloyloxylethyl phosphorylcholine), poly-(sulfobetaine methacrylate), polyalkylene residues having more than 20 carbon atoms, peptide chains, DNA fragments and poly-(sulfobetaine acrylamide), whereby D2 has no functional end group or side group; and
- a side chain D3 having a long chain D3 selected from the group consisting of a polydimethylsiloxane, perfluoroethers, perfluoroalkyls, polyisobutene, polyethylene glycol, polydimethylacrylamide, polyvinylpyrrolidone, polyalkyloxazolines, dextran, carboxymethyl dextran, poly(N-isopropylacrylamide), poly(N-hydroxyethylacrylamide, poly(2-hydroxyethyl methacrylate), polyhydroxypropylmethacrylate), poly-(methacryloyloxylethyl phosphorylcholine), poly-(sulfobetaine methacrylate), polyalkylene residues having more than 20 carbon atoms, peptide chains, DNA fragments and poly-(sulfobetaine acrylamide) whereby D3 carries at least one functional end or side group K3 selected from the group consisting of amines, carboxy, and nitrilotriacetic acid (NTA), biotin, azide, terminal alkene groups, terminal alkine groups, tetrazine.

16. The functional polymer according to claim 14, wherein said functional polymer comprises a further type of side chain E which is intended to irreversibly bind to a substrate, said side chain E having a linear or branched, substituted or unsubstituted C1 to C12 alkylene group which optionally comprises heteroatoms selected from the group consisting of oxygen and nitrogen, and which carries at least one functional end or side group K4 selected from the group of alkoxy silanes, chloro silanes, catechols, nitrocatechols, bromocatechols, chlorocatechols, phosphates, phosphonates, mimosine derivatives, anacheline, gallols, thiols, N-heterocyclic carbenes, perfluorophenyl azides, benzophenon, diaryldiazomethane, aryltrifluoromethyldiazomethane, and organoboron.

17. The functional polymer according to claim 12, wherein the polymer backbone is a polyacrylamide, wherein the polymer backbone and the side chains are linked by amide bonds.

18. A conjugate of a copolymer according to claim 1 and at least one active moiety selected from a therapeutic moiety and a targeting moiety.

19. The copolymer according to claim 1 formulated for use as a coating agent.

20. A method for coating a surface comprising a surface active headgroup, the method comprising coating the surface with the copolymer according to claim 9.

* * * * *